(12) United States Patent
Duquesne et al.

(10) Patent No.: US 7,648,413 B2
(45) Date of Patent: Jan. 19, 2010

(54) COMBINE HARVESTER POWER MANAGEMENT CONTROL

(75) Inventors: Frank Duquesne, Zwevegem (BE); Daniël M. G. Van Overschelde, Torhout (BE); Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 4 days.

(21) Appl. No.: 12/072,312

(22) Filed: Feb. 26, 2008

(65) Prior Publication Data

US 2008/0209878 A1    Sep. 4, 2008

Related U.S. Application Data

(60) Provisional application No. 60/904,235, filed on Mar. 1, 2007.

(51) Int. Cl.
*A01F 12/40* (2006.01)

(52) U.S. Cl. ..................................... 460/112

(58) Field of Classification Search .................. 460/6, 460/7, 116, 3, 119; 56/10.2 R, 14.6, 10.2 G, 56/13.5, 10.2 B, 10.2 C; 701/50, 103, 106; 123/396, 352; 340/684
See application file for complete search history.

(56) References Cited

U.S. PATENT DOCUMENTS

| 4,130,980 | A | 12/1978 | Fardal et al. ................. 56/10.2 |
| 4,296,409 | A | 10/1981 | Whitaker et al. ............. 340/684 |
| 4,542,802 | A * | 9/1985 | Garvey et al. ................ 180/306 |
| 5,679,085 | A | 10/1997 | Fredriksen et al. ............ 475/76 |
| 5,873,227 | A | 2/1999 | Arner ........................ 56/14.6 |
| 5,878,557 | A | 3/1999 | Wyffels et al. ............... 56/13.5 |
| 6,073,428 | A | 6/2000 | Diekhans .................. 56/10.2 R |
| 6,213,870 | B1 * | 4/2001 | Satzler .......................... 460/6 |
| 6,397,571 | B1 | 6/2002 | Ehrecke ................... 56/10.2 R |
| 6,513,311 | B1 | 2/2003 | Berger et al. ............. 56/10.2 R |
| 6,553,300 | B2 * | 4/2003 | Ma et al. ....................... 701/50 |
| 6,655,351 | B2 * | 12/2003 | Sheidler et al. ............. 123/396 |
| 6,865,870 | B2 | 3/2005 | Heisey ..................... 56/10.2 G |
| 7,261,632 | B2 * | 8/2007 | Pirro et al. ..................... 460/6 |
| 7,487,024 | B2 * | 2/2009 | Farley et al. .................. 701/50 |
| 2005/0279070 | A1 * | 12/2005 | Pirro et al. .................... 56/14.6 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A system and method of controlling maximum available engine power of a combine harvester wherein the engine drives the harvester and additionally powers a threshing mechanism for separating harvested crop into grain and crop residue and at least one further crop processing subsystem that may be selectively configured and disengaged, including a straw chopper engageable for chopping the crop residue and propelling the chopped residue from the harvester, structure configurable for directing the crop residue into the chopper or to bypass the chopper, utilizing a controller for automatically reducing the maximum available engine power as a function of the status of the engagement of the subsystems, particularly the chopper and the configuration of the associated structure.

21 Claims, 16 Drawing Sheets

COMBINE HARVESTER POWER MANAGEMENT CONTROL

This application claims the benefit of U.S. Provisional Application Ser. No. 60/904,235, filed Mar. 1, 2007.

TECHNICAL FIELD

The present invention relates generally to a combine harvester having an engine for driving the harvester and for additionally powering a threshing mechanism for separating harvested crop into grain and crop residue and at least one further crop processing subsystem that may be selectively configured and disengaged, and more particularly, the invention relates to a system and method for managing maximum engine power responsive to a variety of different subsystem configurations or operating modes having different power needs, such that the available power more closely matches anticipated needs of the threshing mechanism and crop processing subsystems, thus reducing the possibility of overpowering the subsystems.

BACKGROUND

The current marketplace for work machines, and particularly agricultural machines such as combine harvesters, is substantially driven by advertised horsepower. To keep pace with competition, manufacturers have been substantially increasing available engine power. This peak torque power of the specified engine is required to operate the full complement of product applications and variations. For instance, a combine can be used with a variety of different header configurations, e.g., corn (maize), or small grain (wheat, legumes), which headers can be of vastly different widths, and thus have widely different power requirements. For satisfactory performance, the engine of such a combine harvester has to provide power to each and every crop processing subsystem and the top range combine harvesters have engines that can readily provide the needed power in all modes of operation.

In a combine harvester, the rotating threshing drum or rotor of the threshing mechanism is the greatest power consumer. Residue chopping also requires a substantial amount of power, especially when chopping straw of small grain crops, such as wheat and barley. Thus, when the chopper is configured in the chopping mode, an adequate, relatively large amount of engine power must be available, both for operating the chopper under normal loads, and also when heavier loads are present, such as when a slug of crop residue is processed. This power requirement may vary, however, within a wide range, as a function of the operating speed, and the position of counter or stationary knives of the chopper. In other instances, particularly when it is desired to windrow or swath the crop residue, the straw chopper is bypassed, e.g., by positioning of doors or plates, and may be idle, and even disengaged entirely from the engine. As a further possible configuration, even though the chopper is not configured for chopping, the chopper may still require some amount of available engine power, for instance, as a result of being unintentionally being left running or engaged even though mechanically bypassed, or because of being intentionally left running while bypassed so as to chop any crop residue that still makes it into the chopper, to avoid clogging the chopper. And, as a further possible configuration, the crop residue may be directed to bypass the chopper and instead enter a crop residue spreader, so as to substantially increase the power demand of that device. Each of these configurations will have its own required power level that will be less than the full amount of power that the engine is able to direct to the subsystems, such that if available maximum power is not properly managed for a given configuration, damage can result. And, conversely, if insufficient maximum power is available, performance can suffer.

To explain, when such a substantial power consuming subsystem as the straw chopper is bypassed or disengaged, more power becomes available for the other crop processing subsystems. The spare engine capacity can increase the power applied to other subsystems, such as the driveline of the threshing drum of the threshing or separating apparatus. The operator, who often wants to maximize on harvesting capacity, may tend to use the spare power to accelerate the combine harvester, in order the increase the machine throughput. By doing so, however, an operator risks exceeding a subsystem's capacity. For example, threshing efficiency typically decreases drastically if too much crop is taken in. Overload will eventually result in excessive wear/and or deformation of the components of the crop processing subsystem. Elements of the threshing system, such as threshing slats, may bend and threshing concaves may become distorted. The available amount of power may also exceed the mechanical limitations of the driveline to the threshing drum, thereby shortening the lifetime of components such as drive belts and gearboxes. Thus, it is apparent that it would be desirable to have a scheme or system for more closely or precisely controlling available engine power, under a wide range of possible crop handling or processing subsystem configurations.

Manufacturers have devised a variety of engine power management systems and schemes for combine harvesters. Reference generally, Heisey, U.S. Pat. No. 6,865,870, issued Mar. 15, 2005 to CNH America LLC, which provides a system that provides different overall power levels for different operating modes, e.g., field work verses road travel. There are also known systems that set power levels as a function of equipment connected to the harvester. Several such systems utilize detectors for determining the identity of a header attached to a combine harvester, and provide corresponding stored engine power curves for the particular headers. Reference in this regard, Ehrecke, U.S. Pat. No. 6,397,571, issued Jun. 4, 2002 to Deere and Company. Manufacturers have also devised engine power management schemes for setting available engine power levels as a function of systems of the machine that are currently engaged or operating, e.g., straw chopper, propulsion system, harvester assembly, separator, as indicated by the positions of switches for engaging or activating the respective systems, e.g., the on/off switches for the systems. Reference in this regard, Wyffels, U.S. Pat. No. 5,878,557, issued Mar. 9, 1999 to Deere and Company. Still other engine management schemes rely on sensed measurements of actual power usage of the various systems, for determining available power level values. Reference in this regard, Dickhaus, U.S. Pat. No. 6,073,428, issued Jun. 13, 2000 to Claas Selbstfahrende Erntemaschinen GmbH.

However, an observed shortcoming of setting maximum available power as a function of overall operating mode as suggested above in the first patent, and based on header identity alone, such as proposed in U.S. Pat. No. 6,397,571, is that too much available power may be present in instances when less than all crop processing subsystems are engaged. As noted above, these subsystems often are significant contributors to the total consumed power. In removing the power requirements of one or more of the major subsystems, i.e., turning off or disengaging some of the systems, the balance of subsystems still on or engaged can divide the total available power. In many cases, however, this can result in substantially overrunning the subsystems' functional capability, resulting in grain loss, etc., or exceeding mechanical limits causing failures. It is not cost effective to design every system to carry the maximum available power for a plethora of configurations, but rather it would be preferred to limit available power to the subsystem not exceeding its performance limits.

Setting maximum available power based on the identity of engaged or activated subsystems such as by monitoring on/off switches as proposed in U.S. Pat. No. 5,878,557, also suffers from a shortcoming that practically, it will necessitate setting the available power level to accommodate the maximum expected power usage of those subsystems, and doesn't accommodate reduced power needs of different configurations of the subsystems. For example, as set forth above, an engaged straw chopper may use as little as just a few horsepower. For instance, a chopper may use as little as 20 horsepower, if configured one way, e.g., bypassed and idling, and as much as 150 horsepower if configured another way, e.g., for receiving straw and with stationary knives fully extended or deployed. Thus, this system falls short of providing a closely tailored level of available power for different subsystem configurations having different power needs.

Setting maximum available power as a function of measured actual usage, as proposed in U.S. Pat. No. 6,073,428, suffers from the shortcoming that it must rely on measurement means that can be unreliable, inaccurate, and/or complex, and can require calibration to ensure accuracy, so as to be of limited practicality. Also, the actual power usage can vary significantly during operation as a result of temporary or intermittent operating conditions such as passage of slugs of crop material through the crop processing systems, such that the level of available power will be correspondingly varied, reactive to demand, as opposed to in anticipation of demand, which can be problematic. For example, if the actual power usage during an interval of time is relatively low as a result of smooth operating conditions, the available maximum engine power may be set to reflect this. But, when an abrupt increase in power demand occurs, such as entry of a slug of dense crop material into one or more of the crop processing subsystems, e.g., the threshing system, chopper, or spreader, the additional engine power available may be inadequate. This inadequate power can cause the engine to bog down or stall, such that other subsystem performance suffers. Then, if in response the system automatically or the operator manually increases power, after the need for the additional power has passed, the now available power will not closely match actual power needs.

Thus, what is sought is a control operable for setting a level of maximum engine power available for any given product derivation, configuration or mode, including wherein one or more subsystems of a combine may not be being used, or is configured in any of a variety of relatively low power requirement options verses a higher power requirement option, which control is not reliant on power usage measurement means which may suffer from the shortcomings and disadvantages set forth above.

SUMMARY OF THE DISCLOSURE

What is disclosed is an automatic control system operable for setting a level of maximum engine power available for any given product derivation or configuration of a vehicle, with particular utility for a combine harvester, including wherein one or more subsystems of the combine may not be being used, or is configured so as to be used at a relatively low or intermediate power requirement option verses a higher power requirement option, which control is not reliant on possibly troublesome power usage measurement means, or will otherwise suffer from the shortcomings and disadvantages set forth above.

According to a preferred aspect of the invention, the control utilizes a methodology for limiting available engine power, as a function of engaged subsystems, and the configuration or configurations of the subsystem or subsystems, such that at least a reasonably close approximation of actual power usage can be determined, and the selected maximum available power will closely match possible needed power. Thus, according to the invention, available engine power is reduced with the removal or recognition of disengagement of different subsystem(s) from the total vehicle configuration, and also with the configuration of operational subsystems, at less than their maximum power consumption. The intent is to provide adequate but not excessive horsepower to the configured vehicle to insure functional and/or mechanical performance is not exceeded.

With current available electronic control systems, utilizing a processor based controller, the presence, operation and load of any subsystem (header, straw chopper, etc) can be sensed. According to the invention, from recognition, speed, or load signals, the engine controller would have a predefined table of engine power, e.g., horsepower (HP), levels of which would increase or decrease from a set point the appropriate maximum available power to operate the employed subsystems. As with current unload systems, when the engine controller receives a signal of unloader engagement, the engine is allowed to increase horsepower to offset additional power requirements of the unload system. Also according to the invention, if the straw chopper (large consumer of net horsepower) were removed or not in use, the engine controller will automatically reduce available engine power by the typical chopper power consumption for the selected crop setting, thus not limiting vehicle function but maintaining the appropriate operational power supply to the employed vehicle subsystems, thereby preventing damage, failure or poor functional performance.

Thus, according to the invention, the control is not adding power but limiting or reducing power via mechanical or electronic signal for user defined continuous operation cycles providing overload protection for peripheral subsystems of the subject vehicle.

Examples of an electronic or mechanical signals that can serve as inputs can include, but are not limited to:

Header recognition circuit. When the header is attached to the combine, the header recognition circuit will identify the header and identify its power consumption from known data, e.g., it will know that the header is a 100 HP consumer or a 30 HP consumer by its identity or configuration.

Swath/Chopper door position/sensor(s). When the straw chopper subsystem is configured, a mechanical adjustment of components is made to redirect straw flow into or away from the straw chopper. A device or devices in association with the mechanical linkage, such as an electronic position sensor or sensors would provide feed back to the controller which will responsively set the available engine power down when changing from chop to swath mode, and set the available engine power up when in the chop mode.

Stationary chopper knife bank position sensor. Maximum HP is available when knives are fully engaged, as knives are incrementally retracted to reduce chop length, available engine power is controlled so as to be correspondingly reduced.

BRIEF DESCRIPTION OF THE DRAWINGS

The present invention is best understood with reference to the drawings, in which.

DETAILED DESCRIPTION OF THE INVENTION

Figure 1:
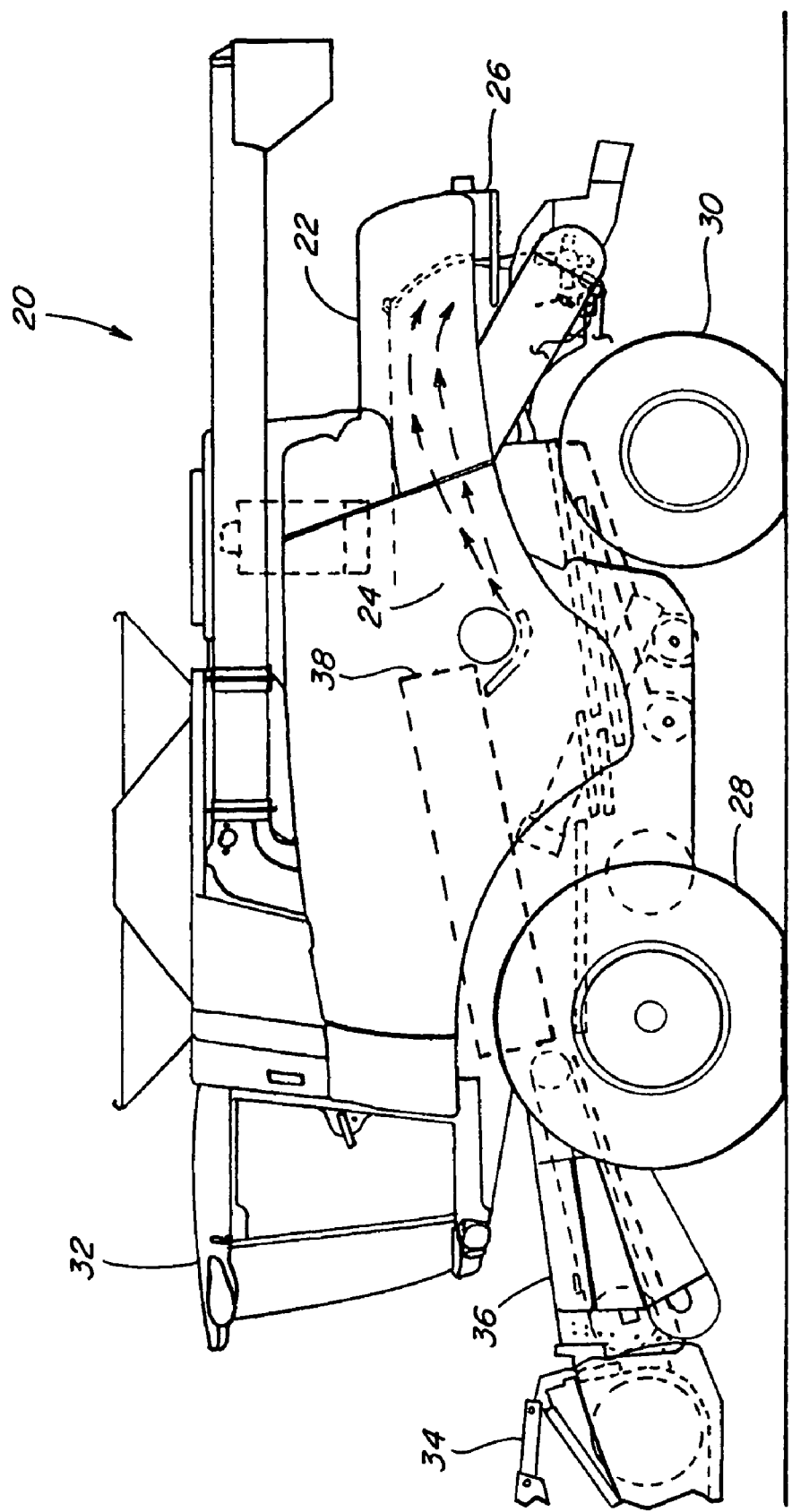
FIG. 1 is a side view, partially broken away, of an agricultural combine.

Referring to the drawings, FIG. 1 shows a self-propelled rotary combine 20 representative of those with which the automatic control system operable for setting a level of maximum engine power according to the invention, can be used. While a conventional rotary combine is shown, it is anticipated that the present invention could be used with any type of combine, such as a conventional combine having a threshing cylinder and separation beaters (not shown) or a hybrid combine having a threshing cylinder and rotors (not shown). However, for ease of explanation, the present invention will be discussed hereinafter in conjunction with a self-propelled rotary combine 20 as illustrated by FIG. 1.

Combine 20 includes a housing or body 22 defining an internal open area or space 24. The body 22 of the combine 20, which can include a supporting frame 26, is supported on front drive wheels 28 and steerable rear wheels 30. The combine 20 is powered by an engine 126 and controlled from an operator's station 32.

A crop harvesting apparatus or subsystem, otherwise referred to as a header 34, and an infeed mechanism 36 are attached at a forward end of the combine 20. The infeed mechanism 36 feeds crop materials to a rotor assembly 38 of a threshing subsystem enclosed within the body. One example of a rotary combine configured with a rotary assembly is disclosed in U.S. Pat. No. 5,489,239, titled "Rotary Combine" and which issued Feb. 6, 1996 to Case Corporation, and which is hereby incorporated herein by reference.

Figure 2:
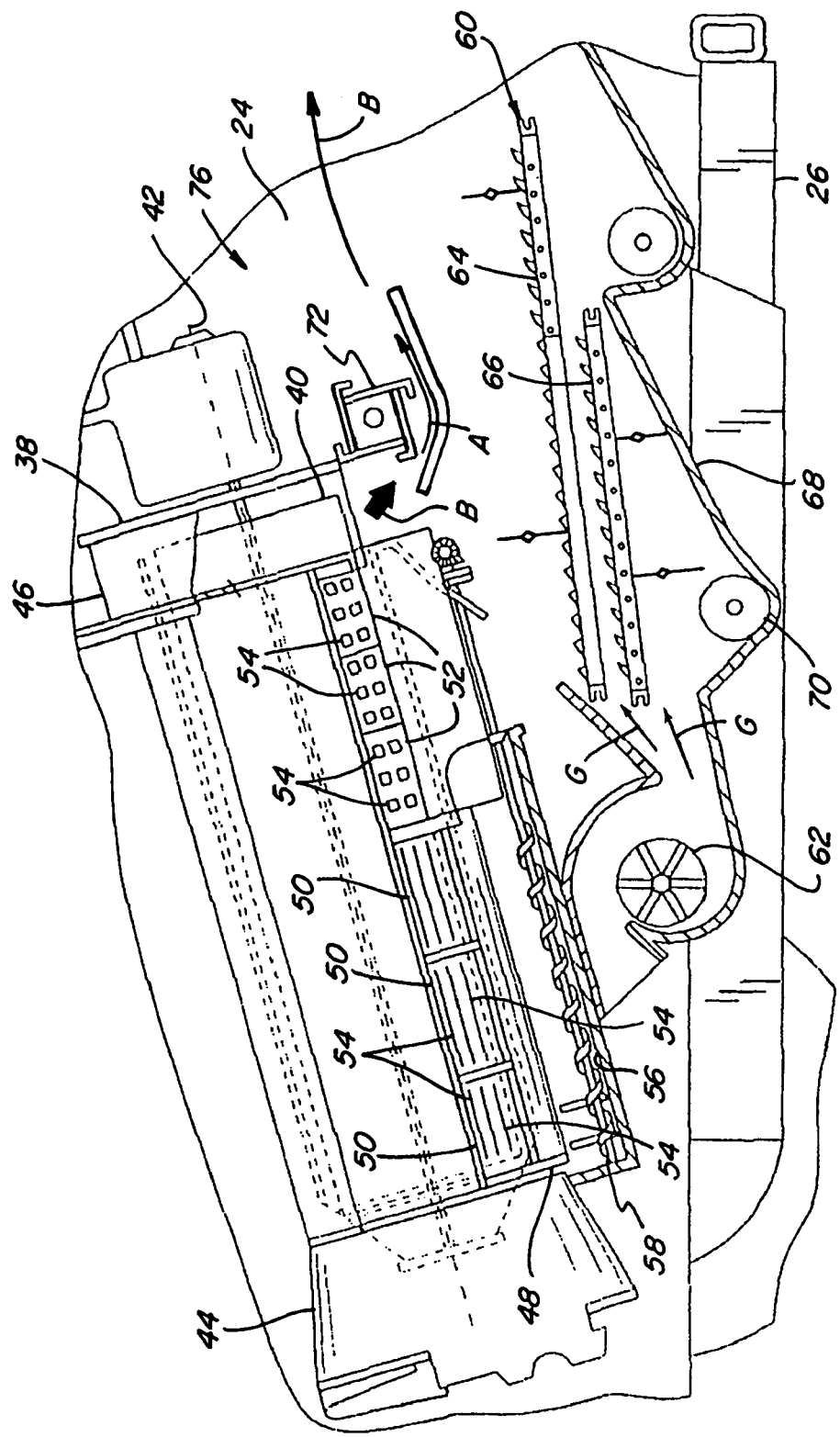
FIG. 2 is a fragmentary left side view of a separating apparatus and cleaning system of the combine shown in FIG. 1.

As best shown in FIG. 2, the rotor assembly 38 is preferably configured as a single axial unit that threshes and separates crop materials presented thereto into grain and other materials. However, it should be appreciated that the rotary combine 20 could be configured with more than one rotor assembly 38, for example, with two units arranged in a parallel configuration. The rotor assembly 38 is mounted in the internal area defined by the body (FIG. 1).

The rotor assembly 38 includes a rotor 40 with a longitudinal extent rotatably mounted to the body 22 about a longitudinal axis of rotation 42, which extends axially along the length of the combine 20. It should be understood that the term "longitudinal" means of or relating to length or the lengthwise dimension. It should also be understood that the rotor 40, with its longitudinal extent, could be mounted within the body 26 so as to extend laterally from side-to-side within the combine 20.

It should be understood that the terms "left side," "right side," "left," "right," "front," "rear," "upper," "lower," "top," and "bottom," and their derivatives, as used herein, are intended to indicate directions relative to the views presented in the Figs., and in particular, from a perspective when viewing the rotary combine 22 of FIG. 1, and the internal components thereof, from the steerable rear wheels 30 toward the crop harvesting apparatus.

Referring back to FIG. 2, between the upstream, or front end 44, and the downstream, or rear end 46, of the rotor assembly 38, the crop material is threshed as it spirals around the rotor 40 against a concave 48 disposed at least partially, circumferentially around the rotor 40. The rotor 40 can be dimensioned with a broad range of diameters, depending on the desired size and performance characteristics of the combine 20.

For example, suitable rotors 40 may have a diameter in the range of fifteen inches to thirty inches, although it should be appreciated that other diameters, larger and smaller, would also work for the purposes of this invention. The rotor 40 is configured with suitable instrumentalities (not shown)

mounted on the peripheral surface thereof that cooperate with the concave 48 to thresh the crops introduced therebetween.

As shown in FIG. 2, the concave 48 can include various semi-cylindrical concave inserts 50 and grate inserts 52, which are generally provided in a lower arcuate fashion and supported by a concave frame (not shown). The rotor 40 is preferably made of steel, and is generally rotated at speeds of between 150 to 1500 revolutions per minute, depending on the type of crop being threshed, and the conditions under which the threshing is being performed. It should be understood, however, that the speed of the rotor 40 is not critical to the operation of the invention, and that other speeds, faster and slower, may be desired and suitable for the purposes of the present invention without detracting or departing from the scope thereof. It should also be understood that it will typically be desirable to rotate rotor at a selected speed, not subject to surging and variations due to excess available engine power.

Figure 3:
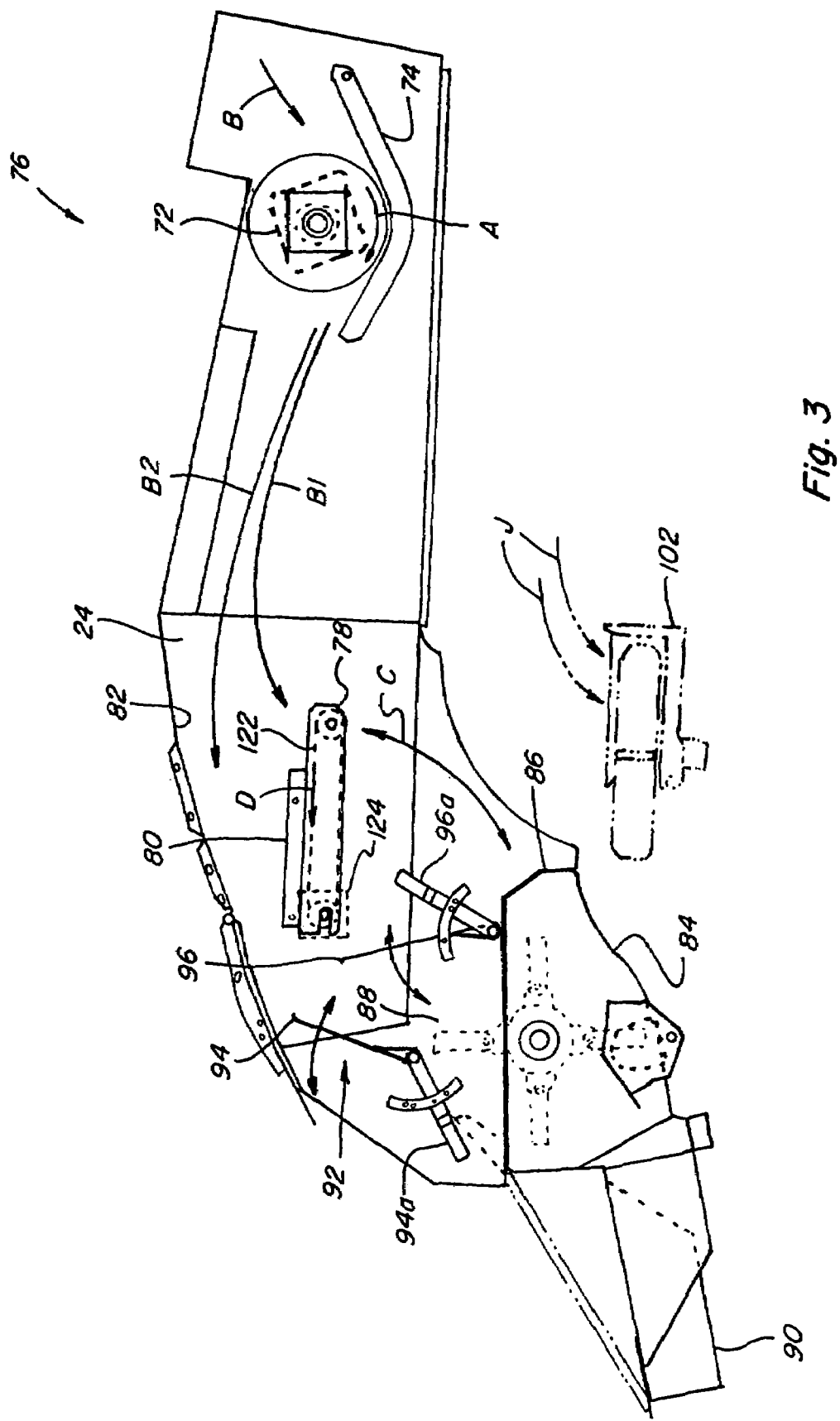
FIG. 3 is a simplified right side view of an interior space of a rear end of the combine, showing a rotary beater for propelling crop residue from the separating apparatus of FIG. 2, and a discharge system of the combine.

Still referring to FIG. 2, the concave inserts 50 and grate inserts 52 each have a plurality of apertures 54 that allow the grain to be separated from the other crop material as the grain passes through the apertures 54. Most of the grain drops onto a grain pan 56. The grain is thereafter-conveyed rearward from the grain pan 56 by an auger mechanism 58 (a grain pan can also be used to transport the grain) for subsequent cleaning and collection by a cleaning system 60 and a discharge system 76, which are also subsystems of the combine for the purposes of the invention, as best illustrated in FIG. 3. It is also typically desired to operate these systems at selected or designated speeds, without variations resulting from power surges.

The cleaning system 60 cleans chaff, crop residue, tailings and other foreign material from the grain. For example, the cleaning system 60 can include a cleaning fan 62, a chaffer sieve 64, a grain sieve 66, and a clean grain collector 68. A suitable auger mechanism 70 can direct clean grain from the clean grain collector 68 into a hopper or grain bin (not shown). The cleaning fan 62 directs a flow of air, denoted by arrows G, upward and rearwardly through sieves 64 and 66, for blowing the chaff and other particles from the grain.

Crop residue and other waste crop material are impelled rearwardly out of the discharge or rear end 46 of the rotor assembly 38 by the discharge system 76. For example, as illustrated in FIG. 2 and more specifically in FIG. 3, a rotary beater 72 rotates, as denoted by arrow A to "throw" or propel, as denoted by arrows B1 and B2, an airborne flow of crop residue and other waste material, particularly straw, through the space 24 rearwardly toward the rear end of the space 24 and the combine 20. The discharge beater 72 is preferably positioned above a beater concave 74 to facilitate this function. Such airborne flow of the crop residue will typically comprise elements of varying size, mass and other characteristics that will influence the distance that the elements of the crop residue will be thrown or propelled through the space 24. Again, like the systems discussed above, it is desired to operate beater 72 at a controlled speed.

Referring also to FIGS. 3 through 9, the discharge system 76 illustrated further includes another subsystem which is a conveying mechanism 78, mounted to the body of the combine 20 by a conveyor mount 80 in a position such as that shown, in spanning relation to a portion of the space 24 just below, or in a lower region of, a path of the rearward flow generated by the beater 72, denoted by the arrows B1 and B2. Some combines will not have or require such a mechanism, depending on the configuration, size, etc. of the combine. Advantageously here, the conveying mechanism is positioned in the path of elements of the crop residue flow B, B1 and B2 that would fall short of a desired destination therefor, such as a rearwardly located chopper and/or spreader or an outlet opening. At the position shown, the front end of the conveying mechanism 72 is located above at least a rear end of a chaff spreader device 102, which coincides with a location of most anticipated short falls of crop residue flow B, B1 and B2.

Figure 14:
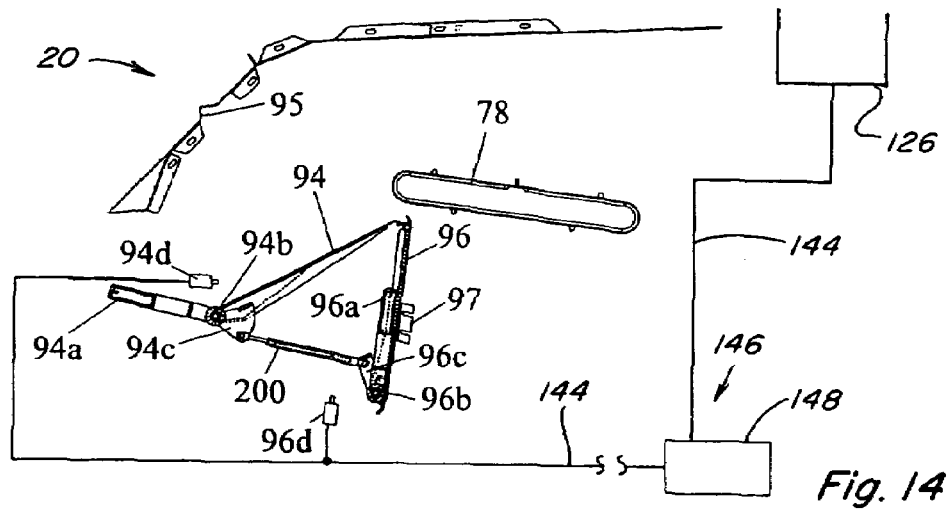
FIG. 14 is another simplified right side view of the discharge system configured in the windrowing mode and showing the states of sensors of the engine power management control system for this configuration.

The conveying mechanism 78 can be optionally mounted for pivotal movement in an upward and downward direction, as denoted by arrow C in FIG. 3, for operation in an alternative position or configuration, as shown in FIG. 14.

The conveying mechanism 78 includes a conveyor drive 124, which can be, for instance, a well known, commercially available hydraulic motor, an electric motor, etc., drivingly rotatable for continuously moving an upwardly facing conveyor surface 122 of conveyor mechanism 78 in the rearward direction, as denoted by arrow D. Conveyor surface 122 is preferably a surface of an endless belt, chain or the like which encircles rollers at the opposite ends of conveying mechanism 78, and can have a generally smooth surface, or a textured surface, or include raised elements thereon, as desired or required for a particular application. The conveyor drive 124 is shown connected in driving relation to one of the rollers for moving conveyor surface 122 in the well known manner.

The conveying mechanism 78 can additionally be optionally rotatable by drive 124 at variable speeds, either under manual control, or automatically responsive to and in adjustment for different characteristics of the crop residue being received and/or other conditions, as represented by one or more predetermined parameters. All drives are indirectly powered by an engine 126.

Located generally below the conveying mechanism 78 are crop residue processing mechanisms or subsystems. For example, a crop residue spreader and/or chopper, represented by a chopper 84 are preferably present below the conveying mechanism 78. It is contemplated that the chopper 84 can be any conventional chopper currently known in the art or any improved version thereof, for chopping and/or spreading crop residue. Regardless, it is preferred that the chopper 84 include a chopper housing 86 having an inlet opening 88 for receipt of crop residue, such as straw. Located rearward of the chopper 84 is preferably a chopper spreader band or guide 90, for directing the crop residue discharged from chopper 84 in a desired manner over a field. Chopper 84 will be discussed more particularly in regard to the present invention below.

Focusing on FIG. 3, it can be seen that another crop residue processing subsystem comprising a guide mechanism 92, is present. The guide mechanism 92 preferably, but not necessarily, includes a door or guide arrangement including at least one pivotal guide or door, such as a pivotal swathing plate 94 and a pivotal chopper selection plate 96, which are pivotable as illustrated by the arrows associated with the respective plates 94, 96. The swathing plate 94 and the chopper selection plate 96 are connected to handles 94a, 96a, respectively, preferably located on the exterior of body 22 and movable for manually positioning the swathing plate 94 and chopper selection plate 96 relative to the chopper 84, to a variety of positions, as shown. Here, it should be noted that the positions of plates 94 and 96 are shown in FIG. 3 in random pivotal positions to illustrate the pivotability thereof.

However, it should be appreciated that the guide mechanism 92 could also be remotely automatically, electronically, hydraulically, or mechanically operable and positionable. For instance, each of the doors could be controlled using a common commercially available rotary actuator, a linkage arrangement, or the like (not shown). Finally, located forward of the chopper 84 is a conventional chaff spreader mechanism or device 102, for receiving a flow of chaff, denoted by arrows J.

Figure 4:
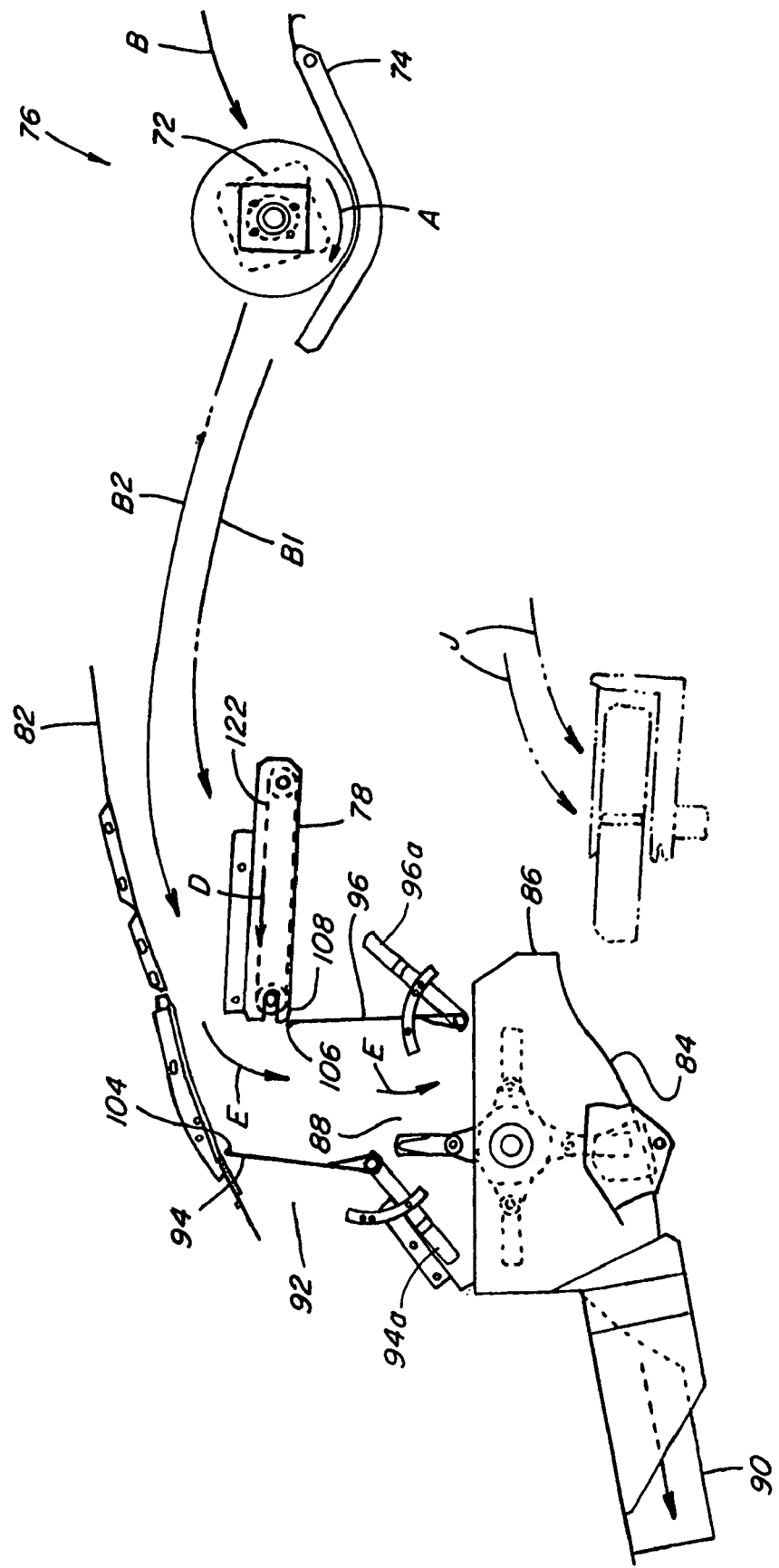
FIG. 4 is another simplified right side view of the interior space and discharge system of FIG. 3, with the discharge system configured in a "chop mode" for directing crop residue into a chopper of the combine.
Figure 5:
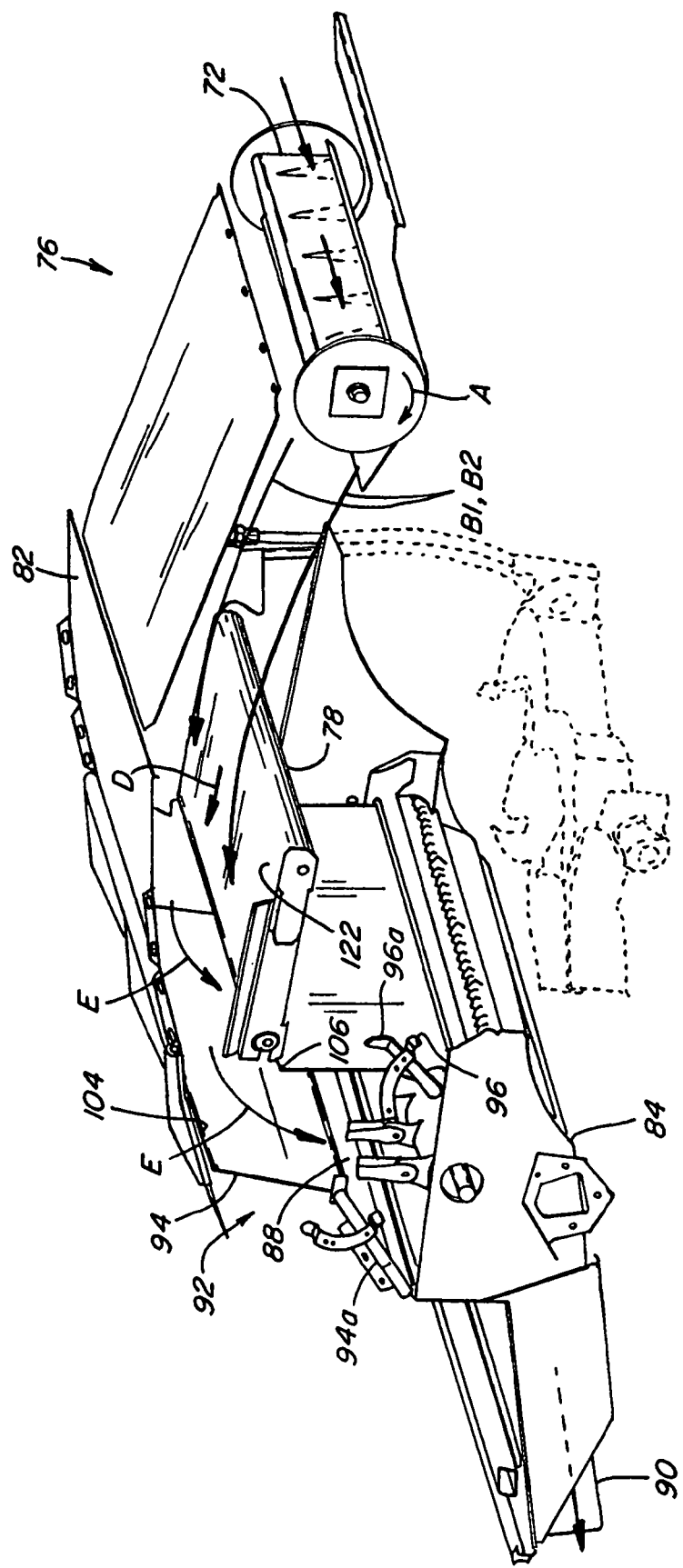
FIG. 5 is a simplified right front isometric view of the discharge system of FIG. 4 configured in the chop mode.
Figure 6:
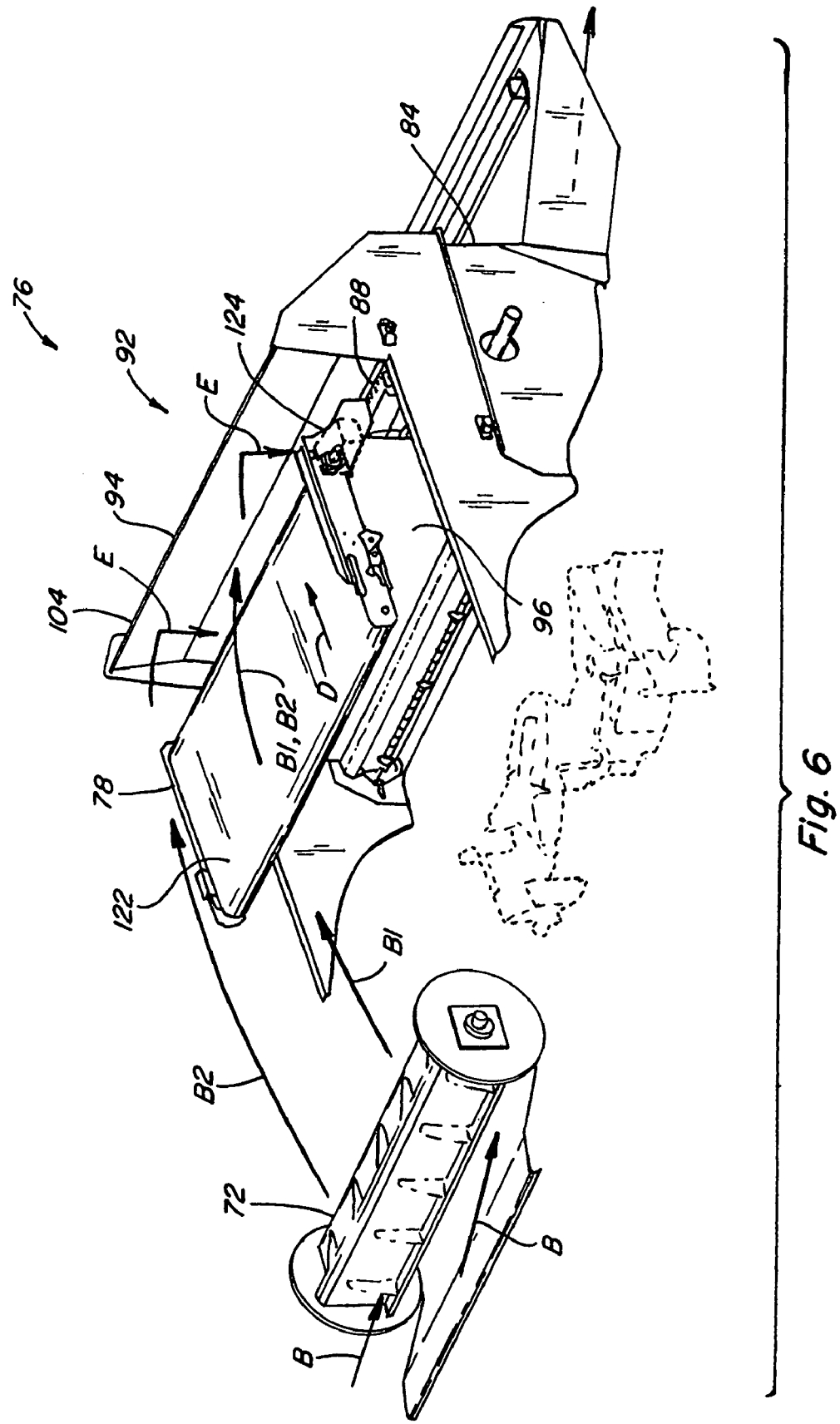
FIG. 6 is a simplified left front isometric view of the discharge system of FIG. 4.

Turning now to FIGS. 4-6, the "chopping mode" embodiment or configuration of the discharge system 76 of the present invention is illustrated. FIGS. 4-6 show the conveying mechanism 78 mounted adjacent to and in spaced relation below, the crop residue hood ceiling 82 of the combine. As illustrated, it is contemplated that the discharge beater 72 will throw or propel a flow of crop residue rearwardly, denoted by arrows B1 and B2, such that some or all of the crop residue, particularly larger elements and wads thereof, represented by arrow B1, will fall or land upon the conveying mechanism 78, and more particularly, on conveyor surface 122, which is moving rearwardly as denoted by arrow D. The moving surface 122 will carry the crop residue deposited thereon rearwardly so as to effectively be merged or mixed with the still airborne crop residue flow B2, which is at the same time being guided downwardly by the hood ceiling 82, so as to reduce the overall vertical extent of the crop residue flows B1 and B2, so as to be more uniform and consistent. The rearward powered movement of surface 122 of conveying mechanism 78 thus facilitates the collection and consolidation or funneling of the crop residue discharge, and positively delivers it, by way of the guide mechanism 92, to the chopper 84, as denoted by arrows E.

Notably, in this embodiment, the swathing plate 94 is positioned by handle 94a generally vertically so that its leading edge 104 abuts or contacts the crop residue hood ceiling 82, for preventing passage of the crop residue rearwardly of plate 94. Similarly, plate 96 is also positioned using handle 96a generally vertical so that its leading edge 106 abuts or contacts the bottom rear edge of the conveying mechanism 78 (FIG. 4), for preventing passage of the crop residue forwardly thereunder. The generally vertical positioning of plate 94 and plate 96 thus direct crop residue into the chopper inlet opening 88 of the chopper 84 for processing thereby.

Consequently, plate 94 disallows exit of the crop residue through the rear of the combine while plate 96 prevents crop residue material from being thrown forward by the chopper 84. Notably, the chaff from the cleaning system 60 remains segregated from the crop residue discharge and is handled by the chaff spreader device 102, as denoted in FIG. 4 by arrows J, or is delivered directly to the harvested field below the combine.

Figure 7:
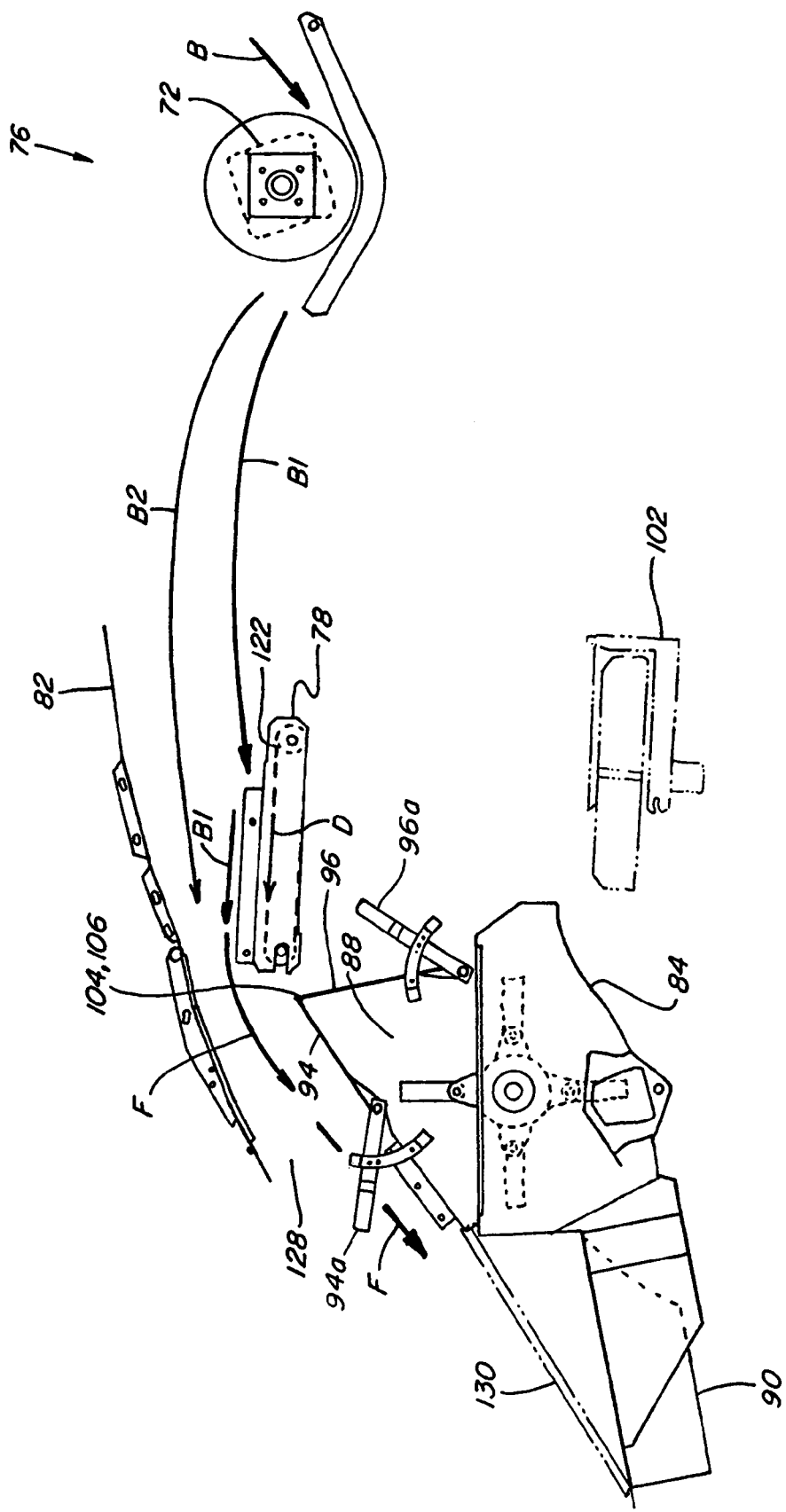
FIG. 7 is another simplified right side view of the discharge system of FIG. 3, configured in a "windrowing mode" for directing crop residue through a rear opening of the body of the combine.
Figure 8:
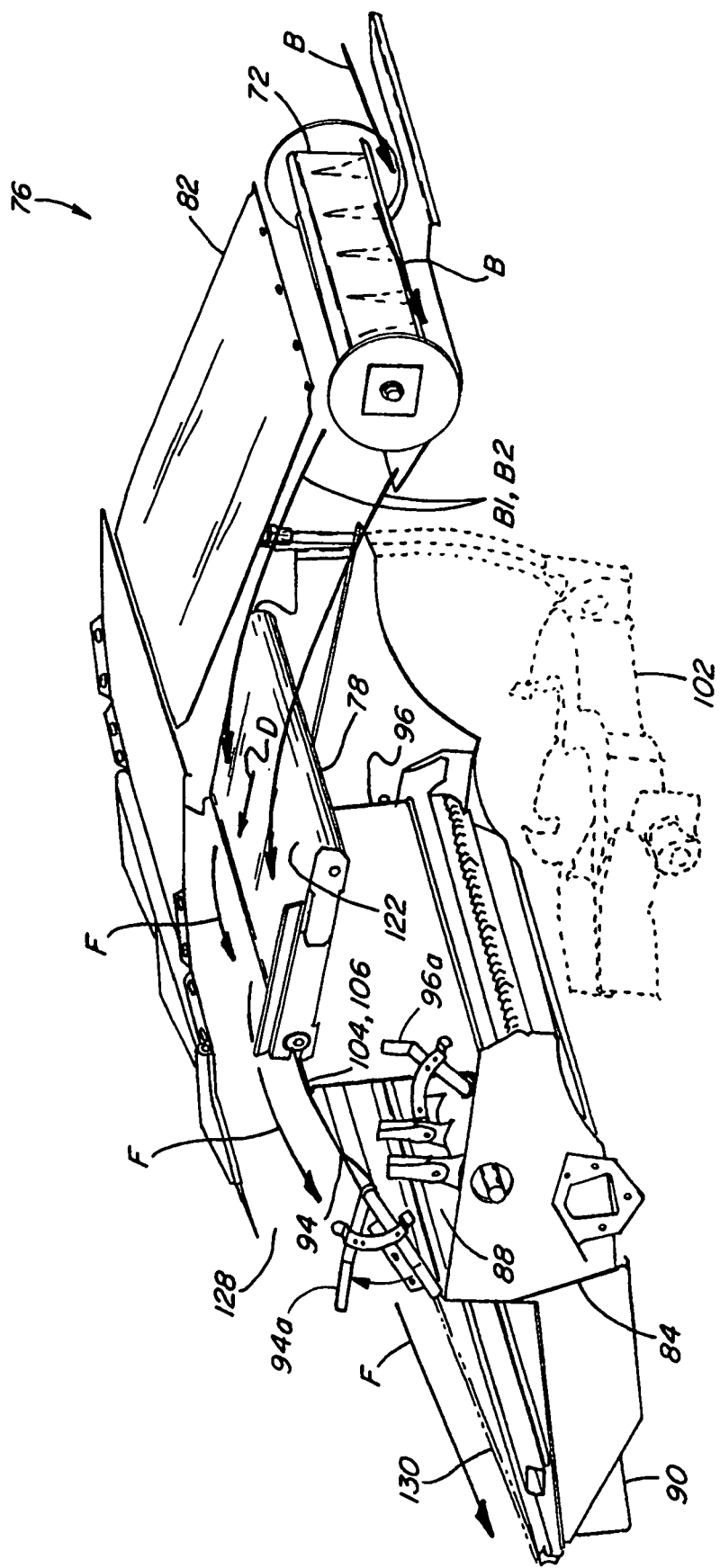
FIG. 8 is a simplified right front isometric view of the discharge system of FIG. 7.
Figure 9:
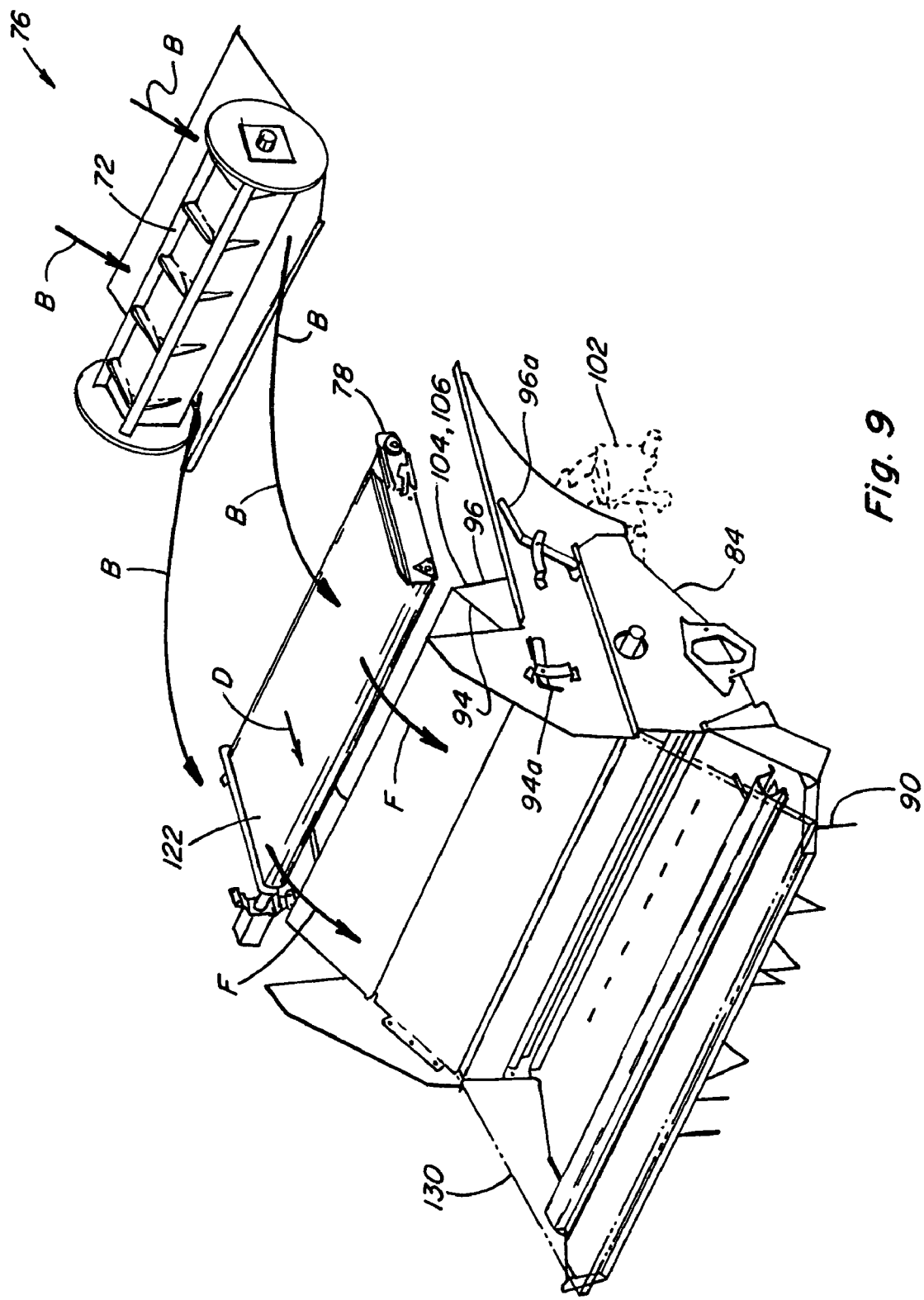
FIG. 9 is a simplified right rear isometric view of the discharge system of FIG. 7.

Turning next to FIGS. 7-9, the "windrow mode" or swathing embodiment or configuration of the discharge system 76 of the present invention is shown. In the windrow or swathing mode, the elements of the crop residue flow B1 and B2 are merged and mixed and consolidated as discussed above by cooperation of conveying mechanism 78 and hood ceiling 82, but instead of being subsequently directed downwardly into chopper 84, the crop residue flow now identified by arrows F, is directed outwardly from the combine through a rear opening 128. To accomplish this, swathing plate 94 and plate 96 are pivotally positioned using handles 94a and 96a and configured to direct the crop residue flow F over the top of and past the chopper 84, and onto a ramp 130 extending downwardly and rearwardly over the rear end of the chopper 84 and spreader band 90. If the crop flow is sufficiently large, it will be reduced in overall vertical extent or funneled by passage between the rear end of the conveying mechanism 78 and hood ceiling 82 so as to exit the rear end of the combine essentially in the form of a continuous, largely cohesive mat. This mat will flow or ride downwardly and rearwardly over ramp 130 and be laid as a windrow onto stubble of a harvested field behind the combine. Chaff is spread from the chaff spreader device 102. In this embodiment, plate 94 and plate 96 converge at their leading edges 104, 106. Accordingly, it is contemplated that generally all the crop residue from the beater (arrows B1 and B2) will be discharged over the chopper 84 to form the windrow. In this configuration, chopper 84 may or may not be operating. An advantage of not operating is that the power to drive chopper 84 is saved. However, crop residue has been found to still enter the chopper housing, through gaps between and around plates 94 and 96, and the like, so as to accumulate and clog the chopper so as to require removal. As a result, some operators prefer to run the chopper even when not in use, which presents still another possible configuration.

Figure 10:
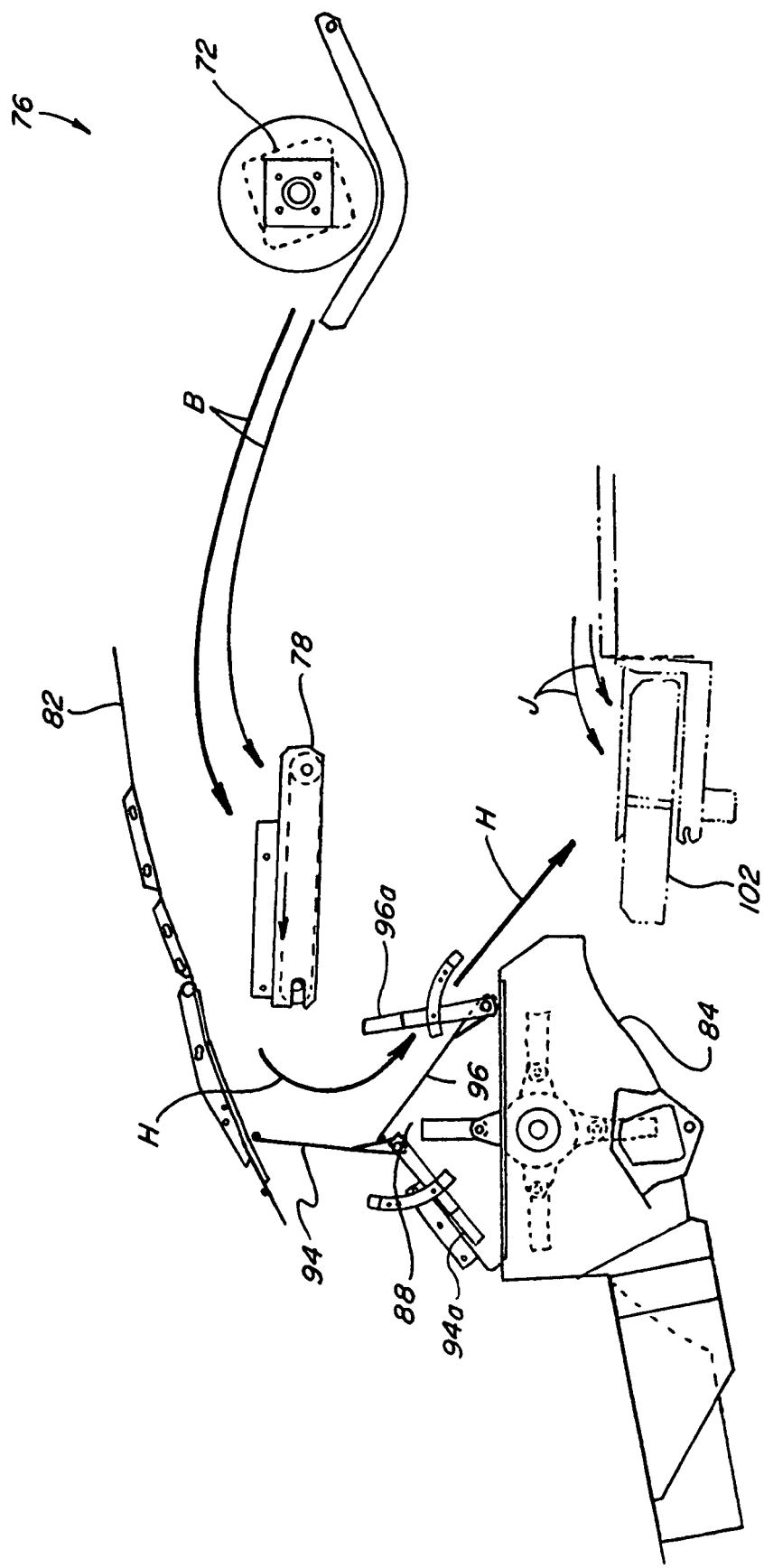
FIG. 10 is simplified right side view of the discharge system of FIG. 3, configured in a "residue spreading mode"
Figure 11:
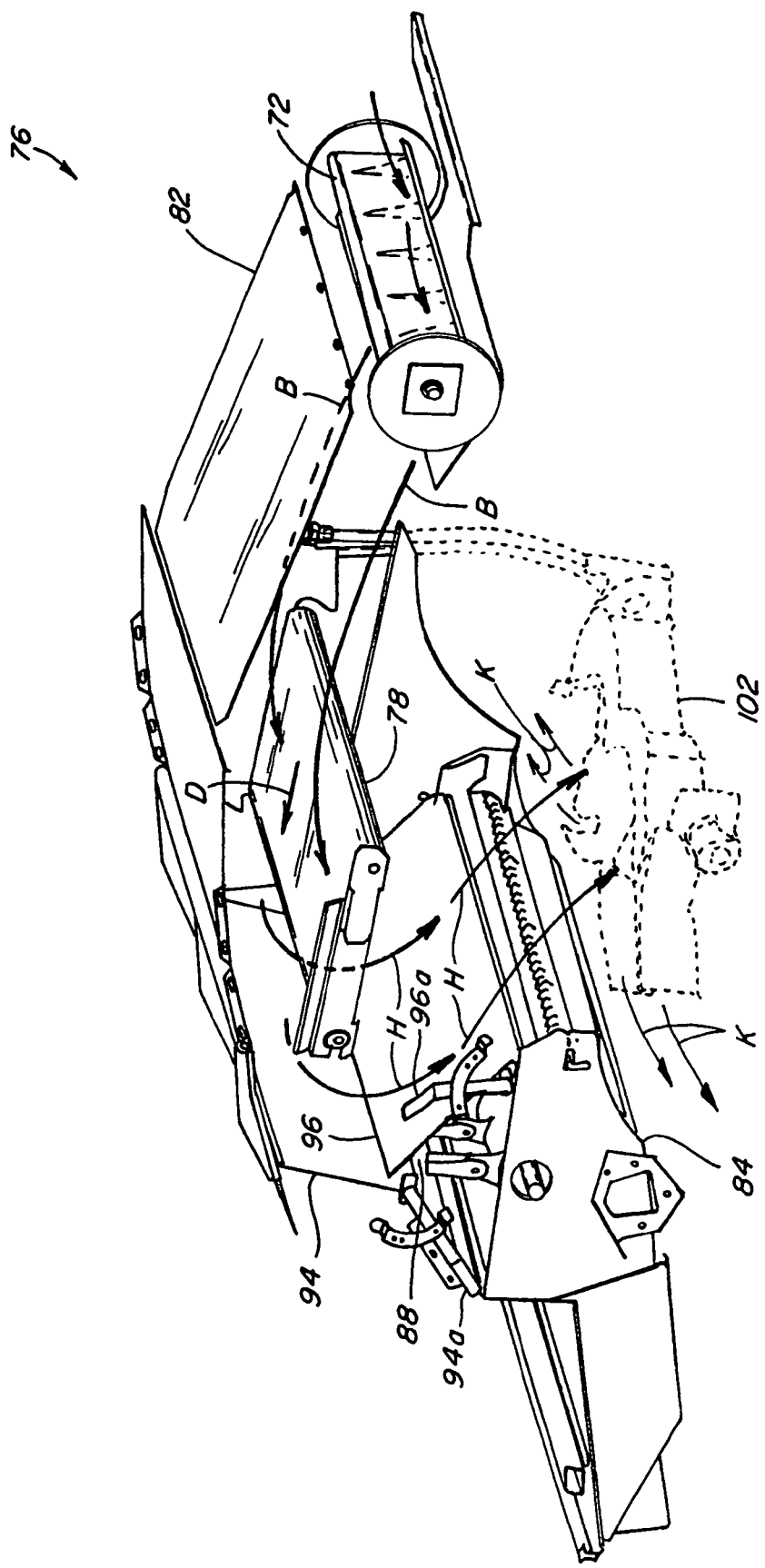
FIG. 11 is a right front isometric view of the discharge system of FIG. 10.
Figure 12:
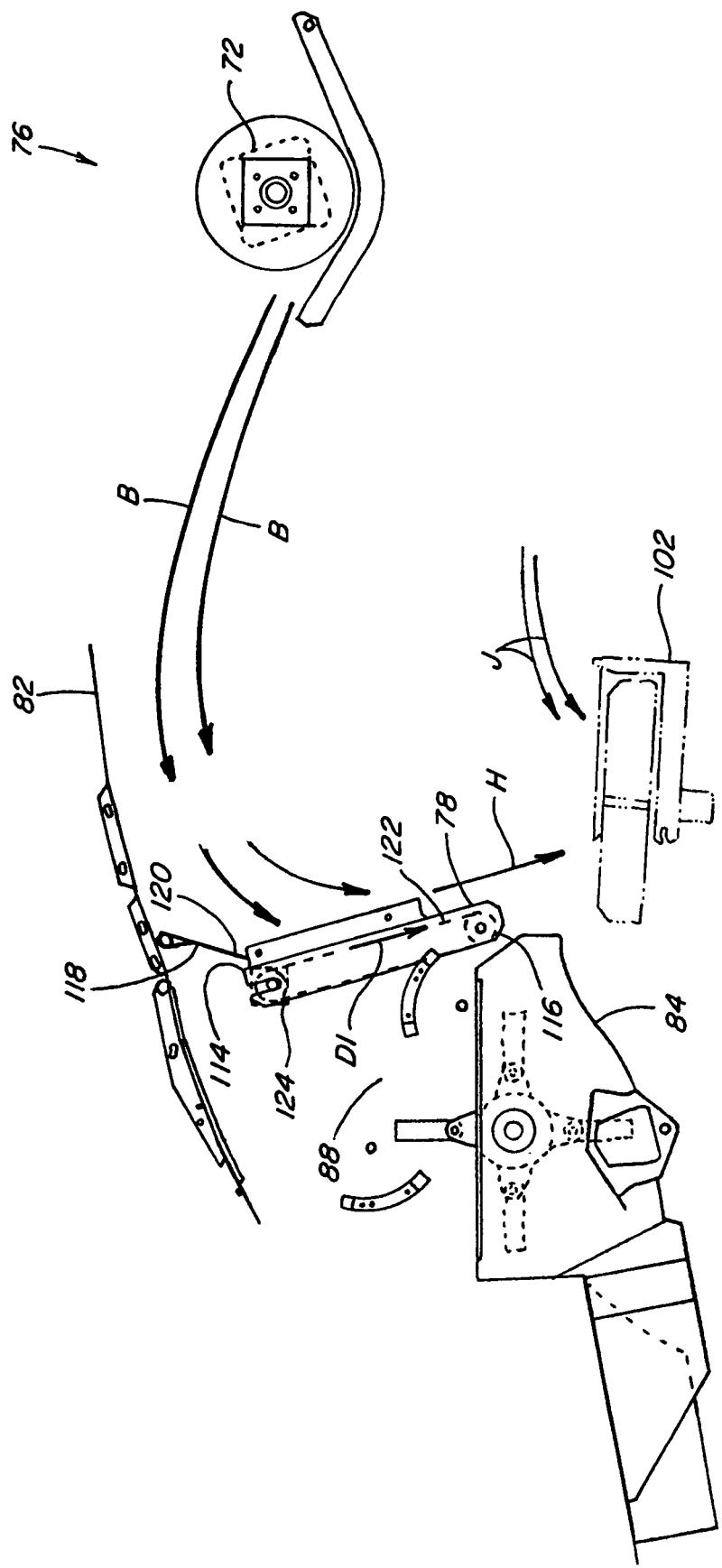
FIG. 12 is an alternative embodiment, shown in a simplified right side view, of the discharge system as configured in FIG. 10, illustrating the pivotal nature of the conveying mechanism.

Turning now to FIGS. 10-12, the "residue spreading mode" or configuration of discharge system 76 is illustrated. Specifically, in FIGS. 10 and 11, plate 94 and plate 96 are configured using handles 94a and 96a to direct all crop residue (e.g. straw and chaff) into the chaff spreader device 102, as denoted by arrows H. Accordingly, plate 94 is positioned generally vertical to disallow crop residue from being conveyed rearward and outward from the combine while the plate 96 is positioned generally at an angular orientation relative to plate 94 to block the chopper inlet opening 88. Preferably all crop residue material will be diverted forward into the chaff spreader device 102, which will spread it, as denoted by arrows K (see FIG. 13). Notably, this mode is particularly useful for handling crops where the residue needs to be spread across the width of the cut, but not chopped. Chaff spreader device 102 also handles the chaff flow, denoted by arrows J.

Focusing on FIG. 12, illustrated is an alternative embodiment of the discharge subsystem 76 in the residue spreading mode. More specifically, as shown, crop residue is diverted directly into the chaff spreader device 102, as denoted by arrows H, by the conveying mechanism 78 which is variably pivoted to an alternative position as shown. It is contemplated that the conveying mechanism 78 can pivot about its rear end 114 as shown, or alternatively, its front end 116, or either of its drive axes, to block travel of the crop residue to the chopper inlet opening 88. A deflector plate 118, which is preferably mounted to the underside of the hood ceiling 82 above conveying mechanism 78, and is positioned generally vertical so that its leading edge 120 abuts a non-moving portion of the conveying mechanism 78. This is intended to prevent rearward flow of the crop material. Again, chaff spreader device 102 also can handle the chaff flow, as denoted by arrows J. Also, the conveying mechanism 78 can be non-rotating, or the direction of rotation of the surface 122 of the conveying mechanism 78 as driven by drive 124 can be reversed, as denoted by arrow D1, to facilitate crop material flow H. Again, it may be desirable to operate the chopper in this configuration, even though blocked off, to prevent clogging.

Figure 13:
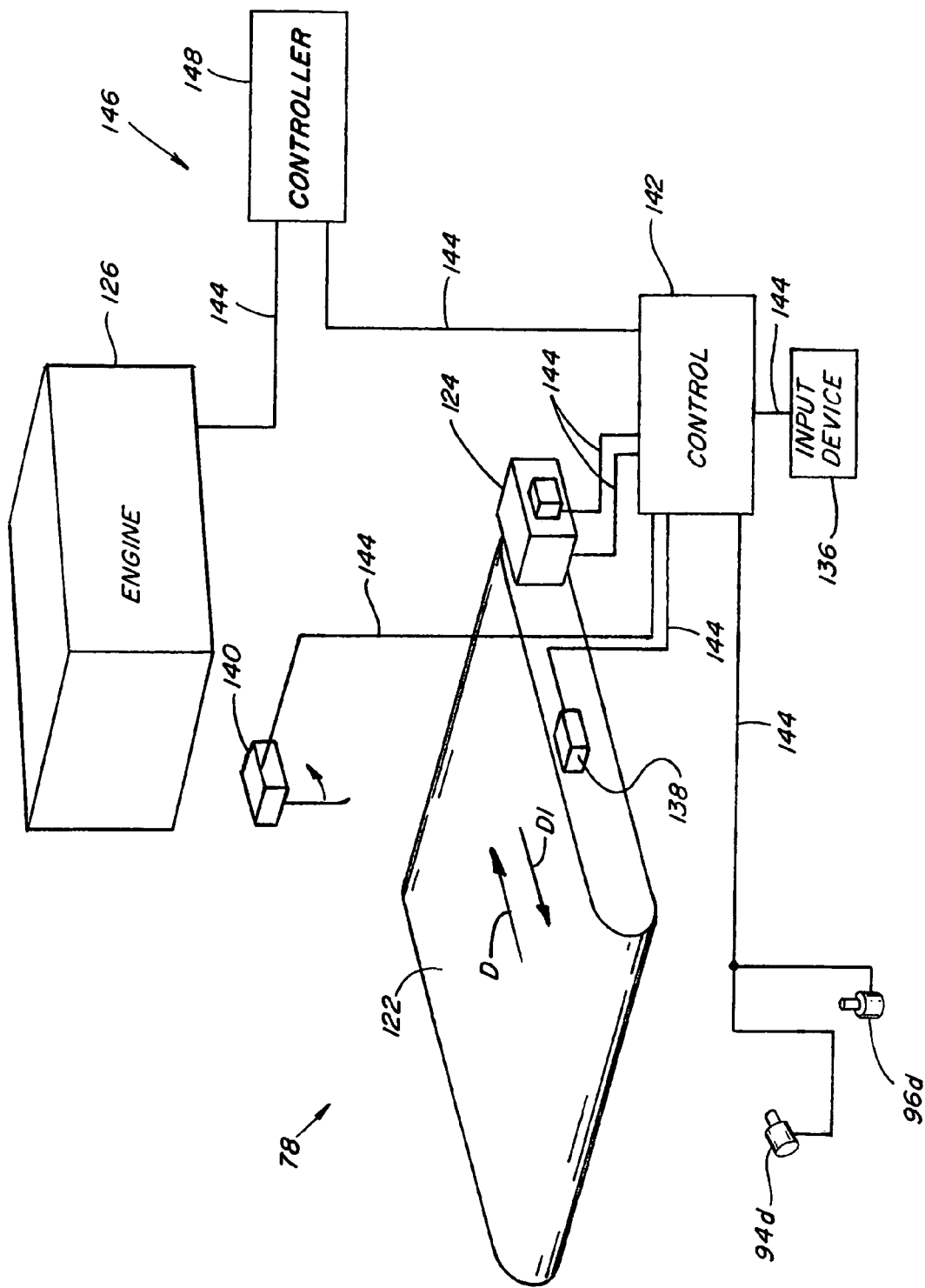
FIG. 13 is a simplified left front isometric view of the discharge system, showing elements of an engine power management control system of the invention.

Referring also to FIG. 13, as noted above, the conveyor surface 122 of the conveying mechanism 78 can additionally be optionally automatically moved in directions D and D1 by drive 124 at variable speeds, to provide still further variations or configurations, either under manual control using a suitable input device 136 in operator's station 32 or elsewhere, or automatically, responsive to and in adjustment for different characteristics of the crop residue being received and/or other conditions, as represented by one or more predetermined parameters. Device 136 can comprise an interactive touch screen device, or the like, operable for inputting commands, and also optionally outputting and/or displaying messages and warnings. Such parameters can include, for instance, but are not limited to, parameters sensed or determined by an element or elements of other subsystems of combine 20, including the header 34, the infeed mechanism 36, the rotor assembly 38, and/or the cleaning system 60, and/or sensors associated with the conveying mechanism 78, such as a load sensor 138 associated with surface 122 for sensing a load thereon, or a contact switch 140 disposed above the surface 122 which will make or break an electrical circuit responsive to contact with a mass of crop residue or straw being conveyed by the surface 122 or being fed into one of the processing devices such as the chopper 84, the spreader 102, or rearwardly from the combine. The speed can be controlled by a conventional commercially available processor based speed control, such as control 142, which can be connected to the drive 124 and the sensor and/or switch by a suitable conductive path, such as wires 144 shown. By such control the conveyor 78 can be sped up or slowed down, as required or desired to regulate crop residue flow into the handling device for optimizing output therefrom and for regulating the characteristics, such as consistency, cohesiveness and the like, of a windrow.

From the above discussion and examples, it is evident that the various subsystems of combine 20 are configurable in a wide variety of ways, having different engine power requirements, and having different susceptibilities to power surges or variations and resultant problems. It has been found that setting maximum available engine power according to just which subsystems are engaged or activated responsive to system on/off switches alone, is disadvantageous as available power levels must be set to accommodate maximum possible system usage. This is disadvantageous as the available power could thus be set 100 or more HP greater than actual demand, so as to lead to the problems set forth above. Providing extra available power responsive to actual measured usage is also disadvantageous, as it is reactive as opposed to proactive, and is sensitive to intermittent demand spikes and inaccuracies in measured demand, as also set forth above. A better system would provide available maximum power determined initially as a function of the propulsion system and engaged subsystems, and which power is decreased as a function of the different subsystem configurations, yet without requiring an on/off switch for each different configuration, or complicated error prone power measurements.

Figure 15:
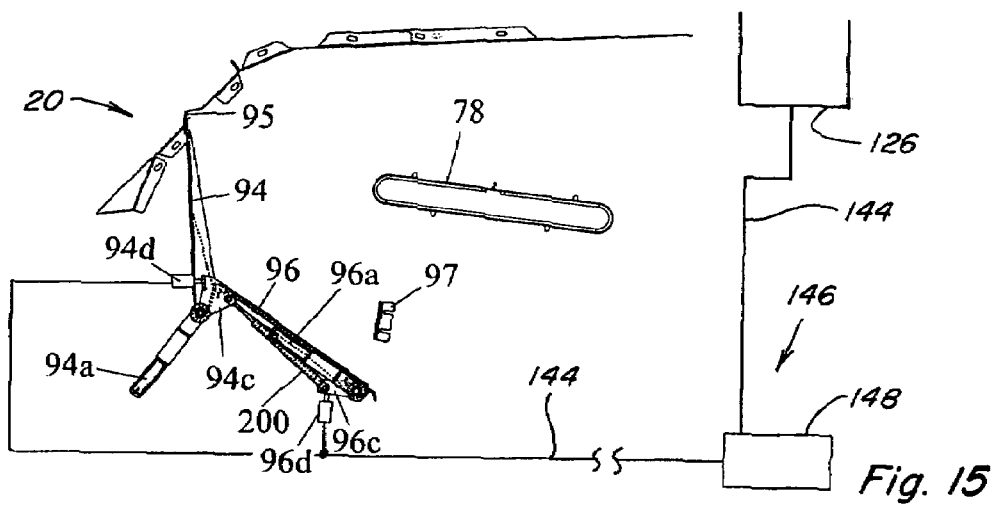
FIG. 15 is another simplified right side view of the discharge system configured in the residue spreading mode and showing the states of sensors of the engine power management control system for this configuration.
Figure 16:
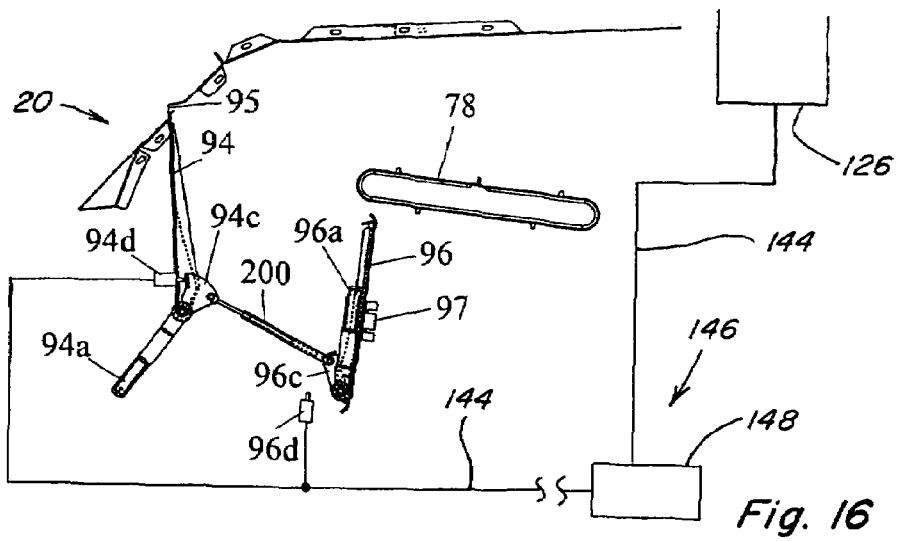
FIG. 16 is still another simplified right side view of the discharge system configured in the chopping mode and showing the states of sensors of the engine power management control system for this configuration.

In FIG. 13, and also FIGS. 14, 15, 16, 17, 18 and 19, elements of a control system 146 of the present invention, automatically operable according to a method of the invention, for setting a level of maximum available engine power initially as a function of propulsion system settings and engaged subsystems, and adjusted downwardly as function of the configurations of the subsystems of combine 20, is shown. System 146 includes a controller 148 which is preferably a processor based controller commonly provided and configured for controlling speed of operation of a combine engine. Controller 148 is connected in operative control of the speed of engine 126, by a conductive path 144. Conductive paths 144 herein can comprise, for instance, wires of a wiring harness of combine 20, and/or a controller area network, data bus or the like. Controller 148 is also illustrated as connected by conductive paths 144 to control 142; to a sensor 94d positioned and operable for sensing a position of plate 94, here, preferably when in the rear position as illustrated in FIGS. 15 and 16, and outputting signals representative thereof to controller 148; and to a sensor 96d positioned and operable for sensing a position of plate 96, preferably the rear position thereof as illustrated in FIG. 15, and also outputting signals representative thereof to the controller. Additionally, controller 148 is connected to a sensor 154 configured for sensing a condition of stationary knives of chopper 84, which condition is preferably a position thereof, or a load thereon; and to a chopper speed sensor 158, for receiving information relating to the configuration and operation of chopper 84. Still further, controller 148 is connected to a number of additional sensors denoted by numbers 160, for receiving information representative of configuration and operation of others of the subsystems of combine 20, including, but not limited to, the header 34, infeed mechanism 36, rotor assembly 38, and/or cleaning system 60. Controller 148 is also connected to an input/display device, such as device 136, operable for use in inputting commands and also displaying warnings and other information.

As discussed above, one of the potentially greatest power consuming subsystems of a combine such as combine 20 is the chopper, represented here by chopper 84. Power demand of chopper 84 can vary from zero, if not engaged; about 20 to 40 HP if engaged but not receiving crop residue flow; and upwards of that range to as much as 150 HP if engaged and receiving a heavy flow of crop residue, and chopping the residue with stationary knives 150 of the chopper fully extended. It is thus desirable for system 146 to be provided with information pertaining to the various possible configuration of chopper 84, particularly, the crop flow status in regard thereto. This can be advantageously obtained from the positions of swathing plate 94 and chopper selection plate 96.

As noted above, plates 94 and 96 can be configured to deflect or guide the crop residue flow along any one of three different paths, using handles 94a and 96a. Handles 94a and 96a are secured to pivot shafts 94b and 96b of the plates 94 and 96, and radially projecting crank arms 94c and 96c are also secured for rotation with the pivot shafts 94b and 96b. Arms 94c and 96c, in turn, are pivotably connected to the opposite ends of a gas strut 200 that acts at all times to push the crank arms 94c and 96c apart. In FIG. 14, plates 94 and 96 are in their first or furthest clockwise position, that is, the forward position, corresponding the swathing mode or configuration discussed above. In FIG. 15, the two plates are in their second or furthest counterclockwise position, or rear position, corresponding to the spreader mode or configuration. In FIG. 16, plate 96 is in its furthest clockwise position but plate 94 is in its furthest counterclockwise position, corresponding to the chopper mode or configuration.

Preferably, spring strut 200 and plate 94 form a toggle mechanism which in all positions other than an unstable over-center position applies a torque to bias pivot shafts 94b and 96b of both plates towards one of their end positions. Essentially, the over-center for each is when the line connecting its axis to the connection point of the spring strut 200 coincides with the line of action of the gas strut 200.

In FIG. 14, in which the plates are in their furthest clockwise positions, the torque applied by strut 200 biases both plates clockwise thereby urging them into their desired positions and holding them again vibration. Plate 96 is held in an upright position below conveyor 78 against a pair of stops 97 that are affixed to the side panels of the combine. Plate 94 is urged downwardly with its outer edge abutting a transverse slat on the outer edge of plate 96.

If handle 94a is manually turned counterclockwise to set the guide mechanism in the chopper mode of FIG. 16, effort must at first be applied to overcome the spring force of gas strut 200. However, once the over-centre position is passed, the spring force of strut 200 will urge plate 94 towards its most counterclockwise position shown in FIG. 16. The outer edge of plate 94 is now urged against a notch 95 in a rear top plate of the combine.

The same toggle action while passing through an over-center position occurs if handle 96 is now moved counterclockwise to set the guide mechanism in the spreader position shown in FIG. 15. The strut 200 now urges the outer edge of plate 96 against a lower portion of plate 94. It will be noted that each of plates 94 and 96 passes through an over-center position when moved between its end positions, regardless of the prevailing position of the other plate. It is advantageous in the present invention for the plates to be spring biased into their end positions by a toggle mechanism in the manner described above. However, it should be emphasized that the plates need not necessarily be manually operated and, if manually operated, a different form of toggle mechanism may be employed to ensure that the plates always lie on one or other of their end positions.

The operator may selectively operate combine harvester 20 in any one of three modes or configurations, namely:

1. small grains—swathing—plate 96 upright—plate 94 down (FIG. 14)
2. small grains—straw chopping—plate 96 upright—plate 94 upright (FIG. 16) or
3. corn—residue spreading—plate 96 down—plate 94 upright (FIG. 15).

It is typically not advisable to chop corn, as the residue degrades quickly. Thus, even distribution of the residue over the harvested field strip is usually what is desired. To this end, corn residue is guided to the spreader 102 (FIGS. 10 and 11). Straw of wheat and barley, to the contrary, degrades more slowly. The operator may wish to bale it afterwards, in which case the crop residue is swathed, bypassing the straw chopper and deposited in a long, narrow strip behind the combine. Otherwise, the farmer might take no interest in the straw, such that the straw may be chopped and spread over the field for ploughing it into the ground later.

In each of these operating modes or configurations, the various subsystems powered by the engine contribute differently to the total engine loading, as set out in the table below.

| Power requirement | Traction (field travel) | Threshing and separating | Residue handling | Header |
|---|---|---|---|---|
| 1) Small grain swathing | +/− | + | − | − |
| 2) Small grain chopping | +/− | + | + | − |
| 3) Corn | + | − | − | ++ |

In this table, the + symbol denotes greater relative power consumption, the − symbol denotes less. Thus, it is evident that Modes 2 and 3 require more power than Mode 1. When swathing, there is a greater risk of overload because the installed engine is tailored to the power needs of the other modes. For instance, the available power may exceed the mechanical limitations of the threshing rotor driveline.

In the present invention, control system 146 is designed to take into account which subsystems are in operation when setting the maximum engine power. In particular, when a subsystem, such as chopper 84, which requires a large amount of engine power, is not operating, the maximum engine output power is limited, that is, reduced, compared to when the chopper is operating, to prevent the spare engine output capacity from being used to increase the speed of combine harvester 20 over the ground. Driving at higher speed could, as earlier mentioned, result in more crop entering the threshing mechanism of the combine harvester than can safely be handled.

To determine the mode of processing of the crop residue, that is, the configuration of plates 94 and 96, the illustrated preferred embodiment of the invention preferably relies on the use of sensors 94$d$ and 96$d$ to output signals indicate the prevailing positions of the two plates 94 and 96. It is convenient to position and suitably mount sensors 94$d$ and 96$d$ as shown but they may alternatively be attached to handles 94$a$ and 94$b$ or to plates 94 and 96. The fact that the plates are always held firmly in their set positions by a spring force, adds to the reliability of the output signals of the sensors.

The output signals from sensors 94$d$ and 96$d$, which may for example be mechanically or magnetically operated, are used as inputs to system 146, to enable the system to determine a suitable level of available engine power as a function of the presence or absence of signals therefrom, but can also be used to generate an alarm when the crop residue is flowing into chopper 84 while the chopper drive is disengaged or to warn the operator to lower a spreader hood at the outlet of the straw chopper while the combine harvester is in swathing mode.

As noted above, sensor 94$d$ is positioned to sense when plate 94 is in its rear position. The absence of a signal from sensor 94$d$ can also be used to indicate that plate 94 is in the swathing position and therefore such an absence of a signal can be interpreted by controller 148 as an indicator to limit engine output power. Using the absence of a signal to trigger a power reduction results in a failsafe operation in that power will also be reduced when sensor 94$d$ is faulty or wrongly positioned. The operator would be alerted to such a defect by a reduction in engine output power when combine 20 is in the chopping or spreading mode.

Sensor 96$d$ associated with chopper selection plate 96 acts in conjunction with sensor 94$d$ associated with swathing plate 94 and a chopper speed or rotation sensor (if utilized), to provide a warning system to the operator to avoid obstruction of the residue flow when chopping and to avoid the chopper running unnecessarily when operating in the swathing mode or the spreading mode. This also gives the operator the informed option to continue operating chopper 84, for such purposes as maintaining the chopper clear of crop residue so as not to become clogged or plugged. Once again, for failsafe reasons, sensor 96$d$ for chopper selection plate 96 should preferably detect when it is in the rear position, in which it obstructs the chopper inlet. When sensor 96$d$ does not detect plate 96 due to a faulty or badly adjusted sensor and the chopper is running, the operator will still be warned that there is a risk of plugging above the straw chopper.

Thus, according to a method of the invention, the absence of signals from both sensors 94$d$ and 96$d$ will provide input information to controller 148 of system 146 that swathing plate 94 is in its forward position; and chopper selection plate 96 is in its forward position, indicating the swathing configuration (FIG. 14), and controller 148 will automatically reduce the level of available engine power accordingly. In particular, controller 148 is configured and automatically operable such that, if the operator has chosen to disengage chopper 84, controller 148 will reduce available power by a greater amount, and if the chopper is engaged, but bypassed, controller 148 will still reduce the power, but by a lesser amount. Chopper speed data from a chopper drive speed or rotation sensor 158 (FIGS. 17-19), if present, can be used as a further factor in the speed adjustment.

The presence of signals from both sensors 94$d$ and 96$d$ will provide input information to controller 148 that swathing plate 94 is in its rear position; and chopper selection plate 96 is in its rear position, indicating the spreading configuration (FIG. 15), and controller 148 will automatically set engine power accordingly. Again, if the operator has chosen to disengage chopper 84, or engage it, this information will automatically be factored into the power setting: more reduction if not engaged, less reduction if engaged. Chopper speed data from the chopper drive speed sensor 158 (FIGS. 17-19), if present, can also be used as a factor.

The presence of signals from sensors 94*d,* but not sensor 96*d* will provide information to controller 148 that swathing plate 94 is in its rear position; and chopper selection plate 96 is in its forward position, indicating the chopping configuration (FIG. 16), and controller 148 will automatically set engine power accordingly. Here, chopper 84 of course will be engaged, and chopper speed data from the chopper drive speed sensor 158 (FIGS. 17-19), if present, can also be used as a factor in determining power. Again, chopping is a high power consuming operation, and the set power level will be considerably higher than for a non-chopping configuration.

Addressing chopper speed specifically, combine harvesters are often equipped with a sensor monitoring the rotation speed of the straw chopper. It would be possible to use a signal from the latter sensor (sensor 158 in present example) to indicate to the controller when the combine is operating in the swathing mode. However, the position of the swathing plate is the preferred criterion for setting the reduction of engine power, because while swathing, the chopper may or may not be engaged. Similarly, monitoring the chopper rotation alone may be disadvantageous when harvesting corn, because, again, the chopper may be engaged or disengaged, per the operator's preference.

Figure 17:
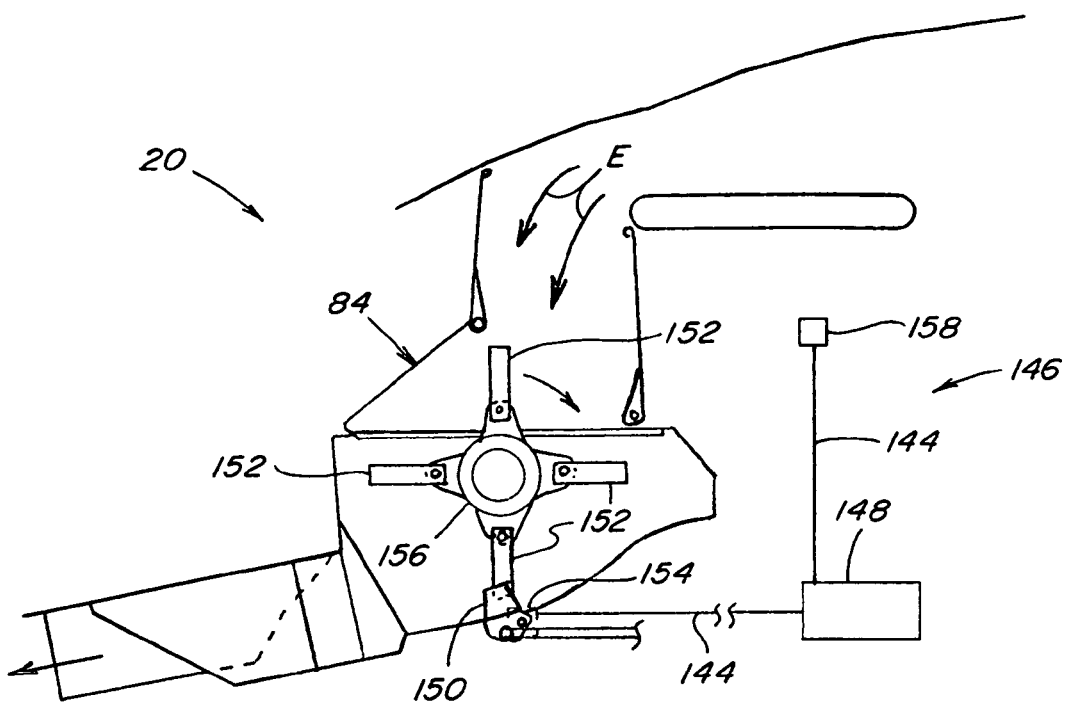
FIG. 17 is a simplified left side view of the chopper of the combine configured in the chopping mode and showing a bank of stationary knives thereof in a fully extended configuration for chopping crop residue.
Figure 18:
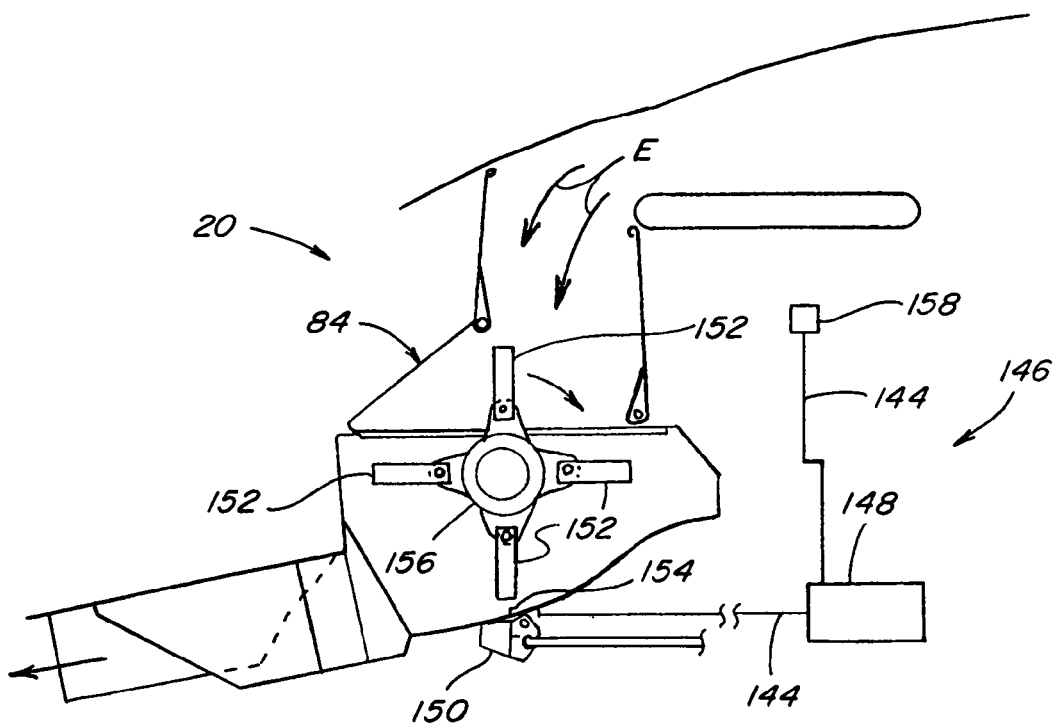
FIG. 18 is another simplified left side view of the chopper configured in the chopping mode and showing the stationary knives thereof in a fully retracted configuration.
Figure 19:
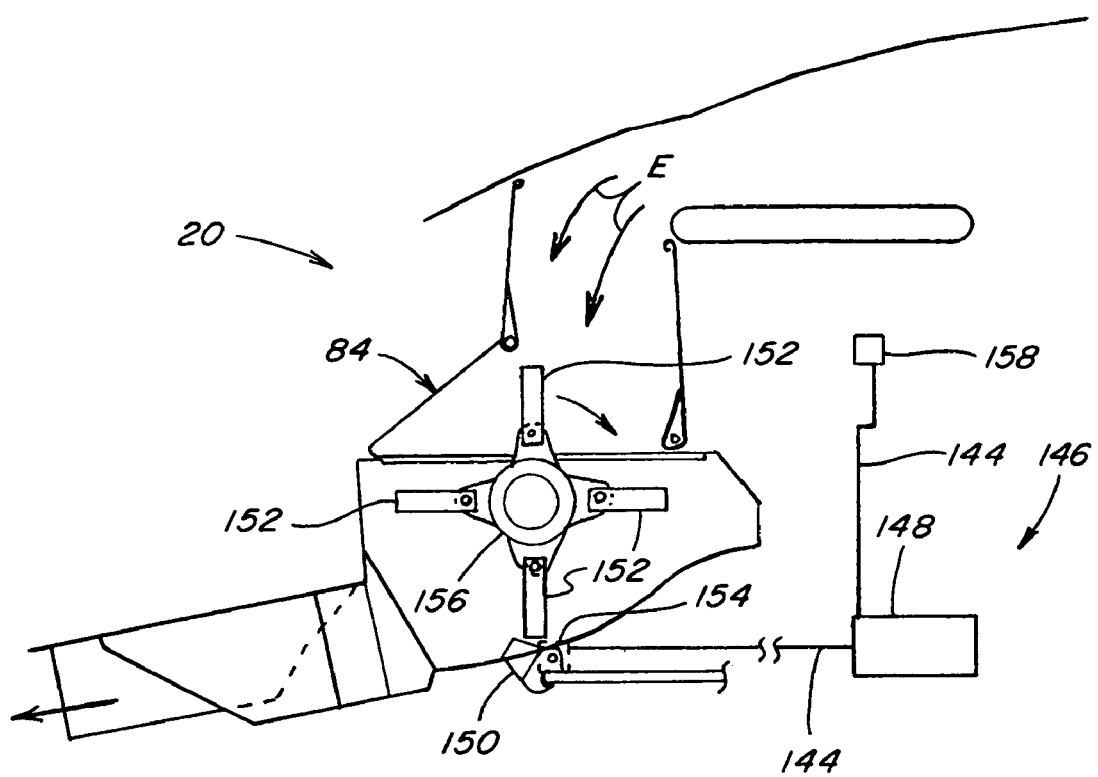
FIG. 19 is still another simplified left side view of the chopper configured in the chopping mode and showing the stationary knives in a partially retracted configuration for chopping crop residue.

Referring more particularly to FIGS. 17, 18 and 19, chopper 84 includes a rotary impeller 156 rotatably driven by the chopper drive, as indicated by the associated arrow, in the well-known manner. Impeller 156 carries a plurality of flail knives 152 which chop the crop residue which enters chopper 84, as denoted by arrows E. An array or rack of stationary knives 150 are movable between at least a fully extended position (FIG. 17) extending into chopper 84 between adjacent ones of flail knives 152, and a fully retracted position (FIG. 18), a representative partially retracted position being exhibited in FIG. 19. A sensor 154 is preferably disposed in association with knives 150, and is configured in operable for outputting a signal representative of the position of knives 150. Alternatively, or additionally, it is contemplated that a load sensor operable for sensing applied loads on knives 150 could be used. Sensor 154 is connected via a conductive path 144 to controller 148 of system 146, as is sensor 158. In the chopping mode or configuration, the signal representative of the position of knives 150, and the speed of the chopper, if known, can be utilized by controller 148 as another factor in the determining of a value for power consumption of chopper 84 (fully extended equals more power; partially retracted equals less power; and fully retracted equals still less power), for reducing the maximum available power accordingly. Thus, this provides yet another indicator of crop residue processing configuration usable for determining a reduction in maximum available power to be applied to the operation of the engine.

Thus, as an important advantage, the system and method of the invention will utilize reliable, relatively simple indicators of operating subsystem configuration, for determining and setting maximum available engine power, so as to more closely match anticipated needs compared to systems that rely solely on subsystem engagement status, and potentially more accurately than those that rely on sensed actual power consumption.

Although an exemplary embodiment of the system and method of the invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A combine harvester, comprising: an engine for driving the harvester and for powering subsystems including at least a threshing mechanism operable for separating harvested crop into grain and crop residue, and a straw chopper, the straw chopper being engageable for receiving and chopping at least a portion of the crop residue and propelling the chopped residue from the harvester, and a first device operable for outputting a signal representative of status of the engagement of the chopper;

structure configurable for directing the crop residue along a path into the chopper, and along at least one alternative path to bypass the chopper, and a second device operable for outputting a signal representative of the configuration of the structure; and an engine control system including a controller connected in operative control of the engine, and to the first and second devices for receiving the signals therefrom, the controller being configured and operable for automatically determining and setting a maximum available engine power limit as a function of at least the status of the engagement of the chopper, and for reducing the limit as a function of at least the configuration of the structure for directing the crop residue, wherein the chopper includes a plurality of stationary knives positionable in a fully extended position which will require the chopper to use a first level of engine power, and at least one retracted position which will require a level of engine power less than the first level, and a third device for determining the position of the stationary knives and outputting a signal representative thereof to the controller, and wherein the controller is automatically operable for adjusting the maximum available engine power limit as a function of the position of the knives.

2. A combine harvester as claimed in claim 1, wherein the structure configurable for directing the crop residue along a path into the chopper, and along at least one alternative path to bypass the chopper, comprises a swathing plate positionable in a swathing position for directing the crop residue rearwardly from the combine, and in a chopping position for directing the crop residue into the chopper, and the second device operable for outputting a signal representative of the configuration of the structure comprises a sensor configured and operable for sensing when the swathing plate is in at least one of the positions thereof.

3. A combine harvester as claimed in claim 2, wherein the sensor is operable for sensing the swathing plate when in the chopping position and outputting a signal representative thereof.

4. A combine harvester as claimed in claim 3, wherein the structure configurable for directing the crop residue along a path into the chopper, and along at least one alternative path additionally comprises a chopper selection plate positionable in a chopping position for directing the crop residue into the chopper in cooperation with the swathing plate when in the chopping position thereof, the chopper selection plate also being positionable in a non-chopping position for preventing entry of the crop residue into the chopper, and the second device operable for outputting a signal representative of the configuration comprises a sensor configured and operable for sensing at least one of the positions of the chopper selection plate.

5. A combine harvester as claimed in claim 4, wherein the sensor for sensing at least one of the positions of the chopper selection plate is operable for sensing the chopper selection plate when in the non-chopping position and outputting a signal representative thereof.

6. A combine harvester as claimed in claim 5, wherein, the controller is programmed to automatically determine the configuration of the structure for directing the crop residue, as a function of the outputted signals, and to set the maximum available engine power limit at a first value when the signals represent that the structure is configured for directing the crop residue into the chopper, and to reduce the limit when the signals represent that the structure is configured for directing the crop residue along a path to bypass the chopper.

7. A combine harvester as claimed in claim 6, wherein if the signals represent that the structure is configured for directing the crop residue to bypass the chopper, and the chopper is disengaged, the controller will further reduce the limit, compared to when the chopper is engaged.

8. A combine harvester, comprising: an engine for driving the harvester and for powering subsystems including at least a threshing mechanism operable for separating harvested crop into grain and crop residue, and a straw chopper, the straw chopper being engageable for chopping at least a portion of the crop residue and propelling the chopped residue from the harvester, and a first device operable for outputting a signal representative of a status of the engagement of the chopper;

structure configurable for directing the crop residue along a path into the chopper, and along at least one alternative path to bypass the chopper, and a second device operable for outputting a signal representative of the configuration of the structure; and an engine control system including a controller connected in operative control of the engine, and to the first and second devices for receiving the signals therefrom, the controller being configured and operable for automatically determining and setting a maximum available engine power limit as a function of at least the number and identity of the subsystems engaged, and for reducing the limit as a function of at least the configuration of the structure for directing the crop residue, including if the structure is configured for directing the crop residue to bypass the chopper, wherein the structure configurable for directing the crop residue along a path into the chopper, and along at least one alternative path to bypass the chopper, comprises a swathing plate positionable in a swathing position for directing the crop residue rearwardly from the combine, and in a chopping position for directing the crop residue into the chopper, and the second device operable for outputting a signal representative of the configuration of the structure comprises a sensor configured and operable for sensing when the swathing plate is in at least one of the positions thereof.

9. A combine harvester as claimed in claim 8, wherein the chopper includes a plurality of stationary knives positionable in a fully extended position which will require the chopper to use a first level of engine power, and at least one retracted position which will require the chopper to use a level of engine power less than the first level, and a third device for determining the position of the stationary knives and outputting a signal representative thereof to the controller, and wherein the controller is automatically operable for reducing the maximum available engine power limit if the knives are in the at least one retracted position.

10. A combine harvester as claimed in claim 8, wherein the sensor is operable for sensing the swathing plate when in the chopping position and outputting a signal representative thereof.

11. A combine harvester as claimed in claim 10, wherein the structure configurable for directing the crop residue along a path into the chopper, and along at least one alternative path additionally comprises a chopper selection plate positionable in a chopping position for directing the crop residue into the chopper in cooperation with the swathing plate when in the chopping position thereof, the chopper selection plate also being positionable in a non-chopping position for preventing entry of the crop residue into the chopper, and the second device operable for outputting a signal representative of the configuration comprises a sensor configured and operable for sensing at least one of the positions of the chopper selection plate.

12. A combine harvester as claimed in claim 11, wherein the sensor for sensing at least one of the positions of the chopper selection plate is operable for sensing the chopper selection plate when in the non-chopping position and outputting a signal representative thereof.

13. A combine harvester as claimed in claim 12, wherein the controller is programmed to automatically determine the configuration of the structure for directing the crop residue, as a function of the outputted signals, and to set the maximum available engine power limit at a first value when the signals represent that the structure is configured for directing the crop residue into the chopper, and to reduce the limit when the signals represent that the structure is configured for directing the crop residue along a path to bypass the chopper.

14. A combine harvester as claimed in claim 13, wherein if the signals represent that the structure is configured for directing the crop residue to bypass the chopper, and the chopper is disengaged, the controller will further reduce the limit, compared to when the chopper is engaged.

15. A method of controlling a maximum available engine power limit of a combine harvester, comprising:

providing an engine for driving the harvester and for powering subsystems including at least a threshing mechanism operable for separating harvested crop into grain and crop residue, and a straw chopper, the straw chopper being engageable for chopping at least a portion of the crop residue and propelling the chopped residue from the harvester, and a first device operable for outputting a signal representative of a status of the engagement of the chopper;

providing structure configurable for directing the crop residue along a path into the chopper, and along at least one alternative path to bypass the chopper, and a second device operable for outputting a signal representative of the configuration of the structure;

providing an engine control system including a controller connected in operative control of the engine, and to the first and second devices for receiving the signals therefrom; and automatically operating the controller to determine and set the maximum available engine power limit as a function of at least the number and identity of the subsystems engaged; and automatically reducing the limit as a function of at least the configuration of the structure for directing the crop residue, including if the structure is configured for directing the crop residue to bypass the chopper, wherein the chopper includes a plurality of stationary knives positionable in a fully extended position which will require the chopper to use a first level of engine power, and at least one retracted position which will require the chopper to use a level of engine power less than the first level, and a third device for determining the position of the stationary knives and outputting a signal representative thereof to the controller, and wherein the controller will automatically reduce the maximum available engine power limit if the knives are in the at least one retracted position.

16. The method as claimed in claim 15, wherein the structure configurable for directing the crop residue along a path into the chopper, and along at least one alternative path to bypass the chopper, comprises a swathing plate positionable in a swathing position for directing the crop residue rearwardly from the combine, and in a chopping position for directing the crop residue into the chopper, and wherein the second device operable for outputting a signal representative of the configuration of the structure comprises a sensor, which senses when the swathing plate is in at least one of the positions thereof.

17. The method as claimed in claim 16, wherein the sensor senses the swathing plate when in the chopping position and outputs a signal representative thereof.

18. The method as claimed in claim 17, wherein the structure configurable for directing the crop residue along a path into the chopper, and along at least one alternative path additionally comprises a chopper selection plate positionable in a chopping position for directing the crop residue into the chopper in cooperation with the swathing plate when in the chopping position thereof, the chopper selection plate also being positionable in a non-chopping position for preventing entry of the crop residue into the chopper, and the second device operable for outputting a signal representative of the configuration comprises a sensor configured and operable for sensing at least one of the positions of the chopper selection plate.

19. The method as claimed in claim 18, wherein the sensor for sensing at least one of the positions of the chopper selection plate is operable for sensing the chopper selection plate when in the non-chopping position and outputting a signal representative thereof.

20. The method as claimed in claim 19, wherein the controller automatically determines the configuration of the structure for directing the crop residue, as a function of the outputted signals, and sets the maximum available engine power limit at a first value when the signals represent that the structure is configured for directing the crop residue into the chopper, and reduces the limit when the signals represent that the structure is configured for directing the crop residue along a path to bypass the chopper.

21. The method as claimed in claim 20, wherein if the signals represent that the structure is configured for directing the crop residue to bypass the chopper, and the chopper is disengaged, the controller will further reduce the limit, compared to when the chopper is engaged.

* * * * *